US006253366B1

(12) United States Patent
Mutschler, III

(10) Patent No.: US 6,253,366 B1
(45) Date of Patent: Jun. 26, 2001

(54) METHOD AND SYSTEM FOR GENERATING A COMPACT DOCUMENT TYPE DEFINITION FOR DATA INTERCHANGE AMONG SOFTWARE TOOLS

(75) Inventor: Eugene Otto Mutschler, III, San Clemente, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/282,102

(22) Filed: Mar. 31, 1999

(51) Int. Cl.[7] ........................................................ G06F 9/45
(52) U.S. Cl. ................................... 717/1; 717/2; 707/100
(58) Field of Search .................................... 717/1, 2, 3, 5, 717/8; 707/3, 4, 10, 100, 103, 513; 709/315, 316

(56) References Cited

FOREIGN PATENT DOCUMENTS

1004987 * 5/2000 (EP) ............................... G06T/15/00

OTHER PUBLICATIONS

Klely, "XML offers standard way of extending HTML", InformationWeek, Oct. 1997, pp. 8–12.*
Levin, "Component modeling tools encourage reuse", InformationWeek, Mar. 1997, pp. 6–11.*

* cited by examiner

*Primary Examiner*—Kakali Chaki
(74) *Attorney, Agent, or Firm*—Alfred W. Kozak; Mark T. Starr; Lise A. Rode

(57) ABSTRACT

A method is disclosed for use in a software development framework having a repository and at least two software systems. The repository contains a meta-model and the software systems, which store instances of the meta-model. The method enables exchange of the instances of the meta-model among the software systems using a generalized data transfer language. The method comprises the steps of extracting a fixed component and a variable of the meta-model; parsing the variable component into a first set of constituent components for a first instance of the variable component; and extracting a list of repeated components from the first set of constituent components. Next, each of the members of the list of repeated components is transformed into components of a generalized software language. Then, the first set of constituent components are transformed into corresponding components of the generalized software language. The first instance of the variable component is then transformed into corresponding components of the generalized software language. The previous five steps are repeated for additional instances of the variable component. After this, the fixed component is transformed into corresponding components of the generalized software language. Then, the corresponding components are distributed among the software systems. The distributed components in the generalized software language can then be used to control the syntax of the generalized data transfer language when used to exchange instances of the meta-model.

23 Claims, 27 Drawing Sheets

METHOD AND SYSTEM FOR GENERATING A COMPACT DOCUMENT TYPE DEFINITION FOR DATA INTERCHANGE AMONG SOFTWARE TOOLS

CROSS REFERENCE TO RELATED APPLICATIONS

This patent document relates to the following patent applications, assigned to the same assignee hereof, which are incorporated herein by reference.

{1070} U.S. Ser. No. 09/282,345, entitled A METHOD AND SYSTEM FOR GENERATING A SIMPLE DOCUMENT TYPE DEFINITION FOR DATA INTERCHANGE AMONG SOFTWARE TOOLS; and, {1072} U.S. Ser. No. 09/282,230, entitled A METHOD AND SYSTEM FOR GENERATING A HIERARCHIAL DOCUMENT TYPE DEFINITION FOR DATA INTERCHANGE AMONG SOFTWARE TOOLS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming; and, in particular to a method and system for generating a compact Document Type Definition for data interchange among software tools; which method makes use of the XML entity, thereby allowing one to group various Attributes, Associations and Compositions for definitional reference in a meta object framework.

BACKGROUND OF THE INVENTION

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse and tool and technology models may be developed to manipulate the tool information in the repository. However, the transferring of data within models from tool to tool or from a tool to the repository has been a cumbersome and unyielding task for a long time.

Repository models typically contain classes, datatypes and messages. As more and more complex models are being built, the need arises for a method and system to transfer data in a model from place to place, e.g., to a tool that understands the UML ("Universal Modeling Language"). The present invention solves this problem by generating a data-transfer syntax in which a tool using a meta-model can transport data from place to place. It is pointed out that the present invention is not limited to UML, but is applicable to a wide variety of languages.

The prefix "meta" as used herein shall describe a relationship. For example, "meta-data" describes data. In a similar fashion, a meta-object is an object that represents "meta-data"; and, "meta-model" means a model that defines an abstract language for expressing other models. A "meta-metamodel" means a model that defines an abstract language for expressing meta-models. The relationship between a meta-metamodel and a meta-model is analogous to the relationship between a meta-model and a model.

It is a tedious and time consuming task to generate a format description for enabling the interchange of metadata among repositories and each different type of modeling tool available. Accordingly, there is a need for automatically generating format descriptions to expedite interchange of metadata among repositories and modeling tools. As will be described hereinbelow, this invention solves this problem by automating the production of an XML DTD for meta-models stored in a MOF-compliant repository by using the XML entity, which allows one to group various Attributes, Associations and Compositions for definitional reference in a meta object framework.

SUMMARY OF THE INVENTION

Accordingly, it is an object of the present invention to provide a method and system that enables ease of interchanging metadata between modeling tools and metadata repositories in distributed heterogeneous environments.

Another object of the present invention is to provide a method and system that allows developers of distributed systems the ability to share object models and other metadata over a network, including the Internet.

Yet another object of the present invention is to provide a method and system that allows data or metadata to be interchanged as streams or files with a standard format based on XML.

A feature of the present invention is the use of entity objects to encapsulate properties and behaviors of each class object thereby making the document type definition (DTD) more compact and giving a clearer picture of the relationships in the meta-model being captured.

An advantage of the present invention is the generation of more compact document type definition (DTD) files resulting in saving of 15% to 20% of space as compared to a simple document type definition file.

A method is disclosed for use in a software development framework having a repository and at least two software systems. The repository contains a meta-model and the software systems, which store instances of the meta-model. The method enables exchange of the instances of the meta-model among the software systems using a generalized data transfer language. The method comprises the steps of extracting a fixed component and a variable component of the meta-model; parsing the variable component into a first set of constituent components for a first instance of the variable component; and extracting a list of repeated components from the first set of constituent components. Next, each of the members of the list of repeated components is transformed into components of a generalized software language. Then, the first set of constituent components are transformed into corresponding components of the generalized software language. The first instance of the variable component is then transformed into corresponding components of the generalized software language. The previous five steps are repeated for additional instances of the variable component. After this, the fixed component is transformed into corresponding components of the generalized software language. Then, the corresponding components are distributed among the software systems. The distributed components in the generalized software language can then be used to control the syntax of the generalized data transfer language when used to exchange instances of the meta-model.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
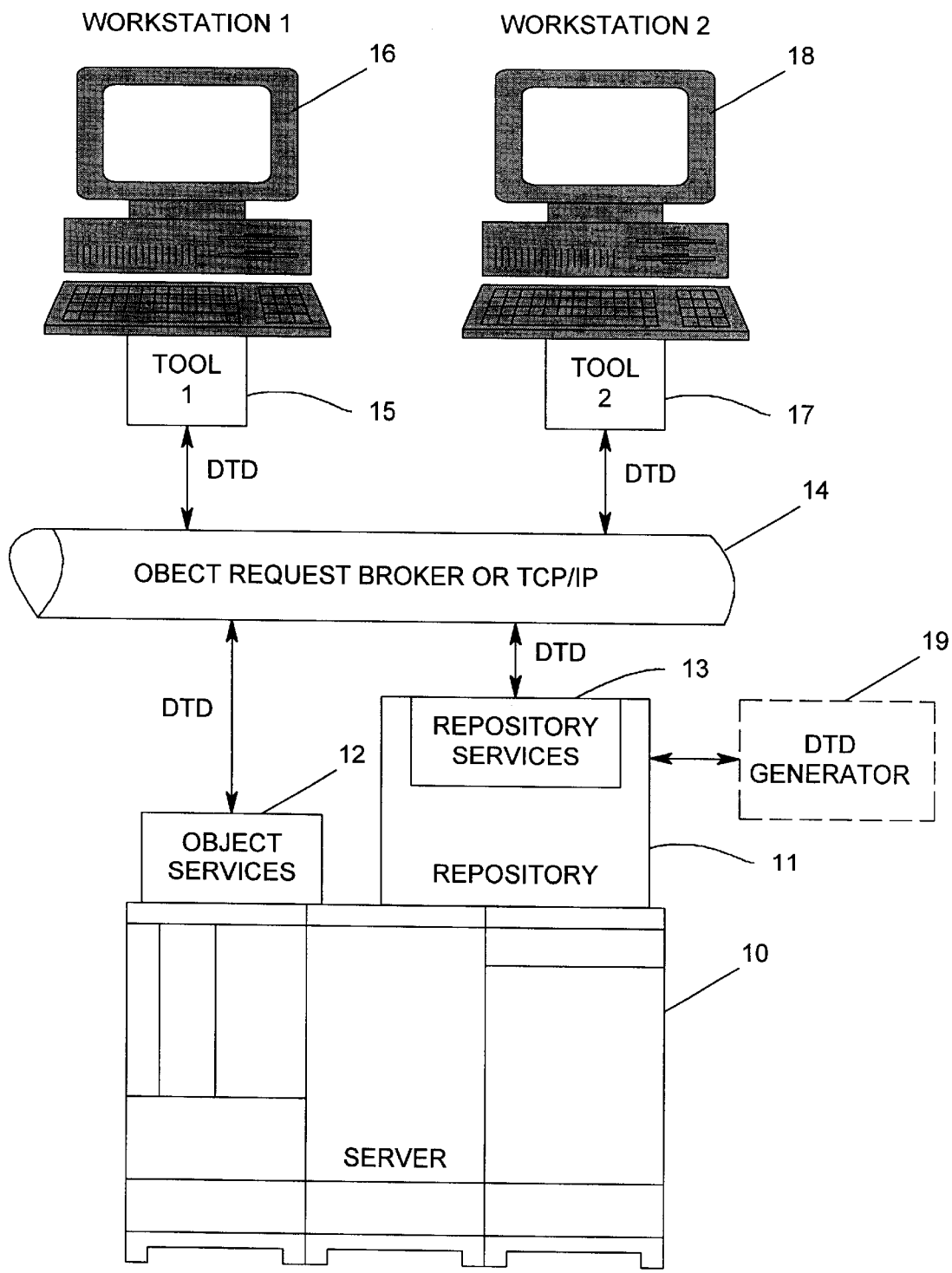
FIG. 1 is a block diagram of a system that my employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

Users of workgroup-based and component development tools are finding it increasingly difficult to coordinate their software development efforts across the enterprise. A solution in accordance with the present invention employs the benefits of XMI (XML Metadata Interchange), which is an open industry standard that combines the benefits of the Web-based XML standard for defining, validating and sharing document formats on the Web with the Meta Object Framework (MOF) to provide a means for generating formats to allow the development tools to share information. One particular use of this invention is to define an XML DTD for the object-oriented Unified Modeling Language (UML). The XMI specification provides application developers with a common language for specifying transfer syntax for development language that allows visualizing, constructing and documenting of distributed objects and business models. The XMI specification in conjunction with the present invention will enable integration of development tools from multiple vendors, collaboration and distribution of object-oriented design and database schema information, and enhancement of the life cycle of information resources.

Software architectures based on meta-models are transforming how one can design an architecture for dynamic distributed systems. The UML and MOF specifications establish a robust meta-model architecture for distributed object applications. The XMI specification extends this architecture by leveraging technologies developed for the Web to exchange models between tools, applications and repositories.

In order to accomplish the objects of the present invention it is necessary to generate Document Type Definitions ("DTD") for the Extensible Markup Language ("XML"), a World Wide Web Consortium standard. A DTD is a set of rules governing the element types that are allowed within an XML document and rules specifying the allowed content and attributes of each element type. The DTD also declares all the external entities referenced within the document and the notations that can be used. Stated otherwise, an XML DTD provides a means by which an XML processor can validate the syntax and some of the semantics of an XML document. An XMI DTD specifies the particular elements allowed in an XMI document.

The present invention describes algorithms for generating an XMI DTD for any valid meta-model defined in a MOF-compliant repository. Referring now to FIG. 1 a block diagram of the system that may employ the present invention is shown. A server 10 executes a variety of software including a repository 11 and object services 12. The repository 11 includes a set of repository services 13, which also couple the repository to an object request broker ("ORB") 14. The object services 12 also couples the server to the ORB 14. It is noted that a TCP/IP connection will suffice in lieu of the ORB 14. A first tool 15, which is being executed by a first workstation 16, is coupled to the ORB 14. In a similar manner, a second tool 17, which is being executed by a second workstation 18, is also coupled to the ORB 14. As will be explained in greater detail hereinbelow, the present invention includes a DTD generator 19, which effects data interchange among the tools 15 and 17 and the repository 11 by defining the contents of the messages exchanged. The DTD generator 19 is illustrated in dashed lines to denote the fact that it appears earlier in time than the actual data interchange. That is, the DTD is first generated then it is subsequently employed for communication by the repository 11 with the tools 15 and 17.

In the disclosed embodiment, the repository 11 is a specialized, extensible object-oriented database application that adds value to a database system, which allows customization of a particular domain (such as application development).

The repository 11 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

Figure 2:
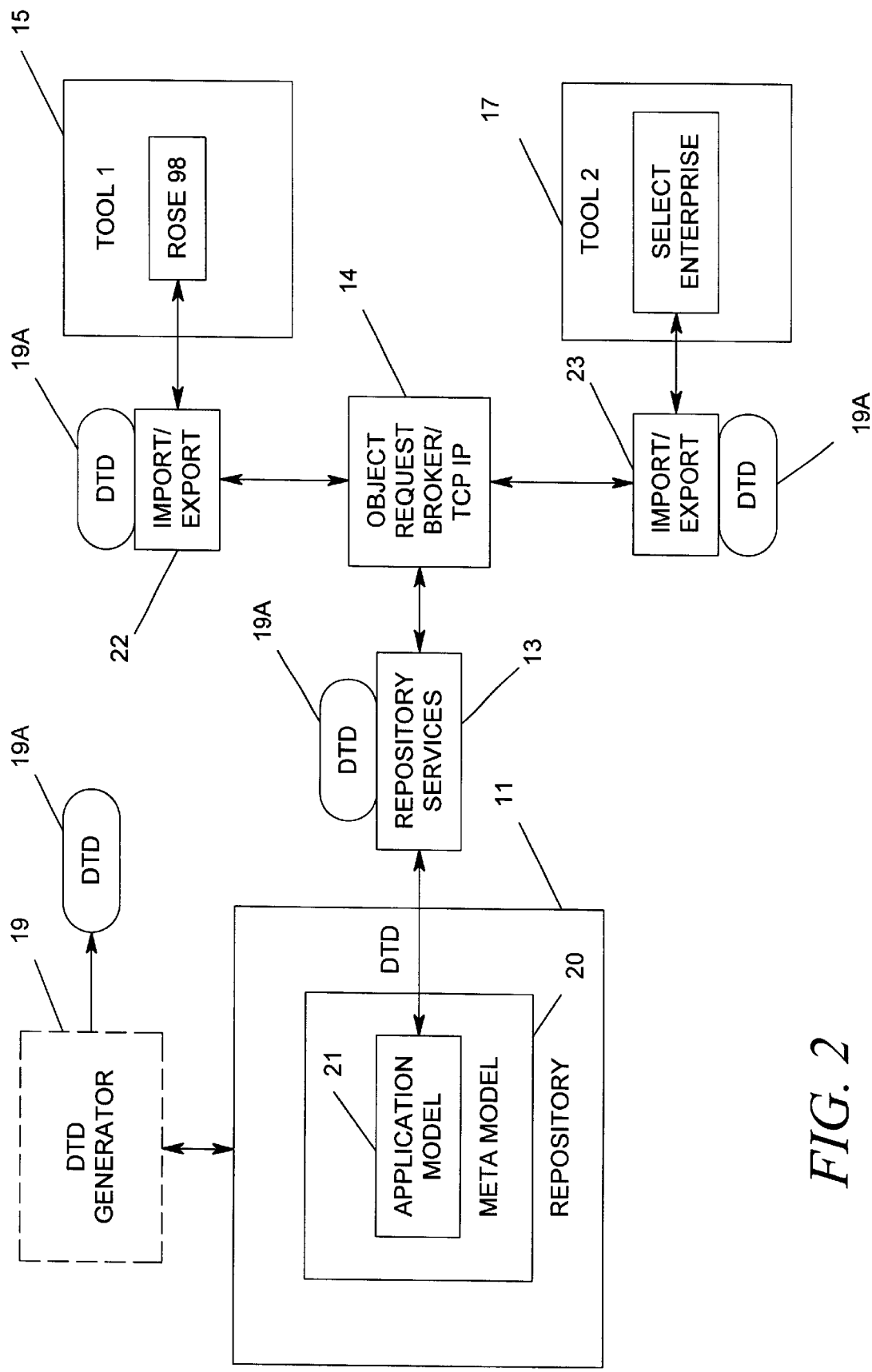
FIG. 2 is a software module block diagram of particular embodiment that may employ the method and system of present invention.

Referring now to FIG. 2, a software module block diagram of a particular arrangement that may employ the method and system of the present invention is shown. The repository 11 contains within it a meta-model 20, which includes an application model 21 that is made available (via the repository services 13) to the ORB 14. The DTD generator 19 is again illustrated in dashed lines to denote the fact that it is occurs earlier in time. The application model 21 may for example comprise an accounting system; and, the meta-model 20 could be UML.

The ORB 14 is coupled to the tool 15 by means of an import/export module 22; and, in a like manner to the tool 17 by means of an import/export module 23. The term "import" as used herein shall mean the creation of an object based on a description of an object transmitted from an external entity. The term "export" as used herein shall mean the transmission of an object to an external entity. The application model 21 communicates with the ORB through the repository services 13.

In operation, the DTD generator 19 accesses the meta-model 20 and then produces a DTD (bubble 19A). Using the DTD thus created, the Repository Services 13 is able to generate an XMI data stream from the Application Model 21. This XMI data stream can thus be communicated through the ORB 14 to the input/export module 22 or 23. The DTD is then used by the module 22 or 23 to place the data from the Application Model 21 into the Tool 15 or the Tool 17.

Alternatively, the input/export module 22 or 23 can use the generated DTD to extract model information from the Tool 15 or the Tool 17, and to create an XMI data stream. This data stream can be communicated via the ORB 14 to the Repository Services 13, which can use the DTD to populate an application model such as the Model 21 in the Repository 11.

There are various methods by which the DTD generator 19 can produce the DTD (bubble 19A). The method described herein produces a compact DTD, which allows one to group the various Attributes, Associations and Composition for later referential use. As the DTD productions in the first above-cited co-pending patent application (hereafter referred to as the "First Rule Set") are very simple, they can result in large DTD's. The repetition of detail also makes it difficult to perform modifications for the purposes of extension or experimentation. This is due to the fact that the object contents and any enumerated attribute list values are given for not only an object but for all of the Classes from which it is inherited, direct or indirect.

The method of the present invention allows for grouping of the parts of an object into XML entity definitions. These entities may be used in place of the actual listing of the elements. This makes for more compact DTD files. The savings is about 15 to 20 percent over that of the First Rule Set. In addition, since the Attributes, References and Compositions of an object are defined in only one place, modification is greatly simplified.

The present invention requires more computational complexity than that required for the First Rule Set. In particular, the DTD generation program must be able to keep a table of generated enumerated type entities in order to re-use them and avoid duplicate entity generation. As in the First Rule Set, the DTD for a MOF-based meta-model comprises a set of DTD definitions for the outermost Packages in the meta-model.

An XML DTD may define a "root element" in which all content is defined. The root element for an XML DTD is the "XMI" element. The XMI DTD element produced by the method of the present invention comprises the meta-syntactic hierarchy illustrated in FIGS. 3A through 3C, and described hereinafter. The following convention is used in describing FIGS. 3A through 3C. A bubble represents a meta-syntactic variable of the DTD grammar being used by the method of this invention. It may be attached to other bubbles by one of three types of arrows. An arrow that points to the right indicates that bubble to the left and the bubble to the right form a sequence. An arrow pointing from a bubble to itself indicates that the bubble may be repeated in a sequence. An arrow pointing downward indicates a syntactic resolution. That is, the item in the lower bubble refines the item in the upper bubble, or stated conversely, the upper bubble "produces" the lower bubble. When there is more than one downward pointing arrow, the bubbles so connected represent mutually-exclusive alternative resolutions of the upper bubble. In other words, the upper bubble produces exactly one of its possible alternatives.

Figure 3A:
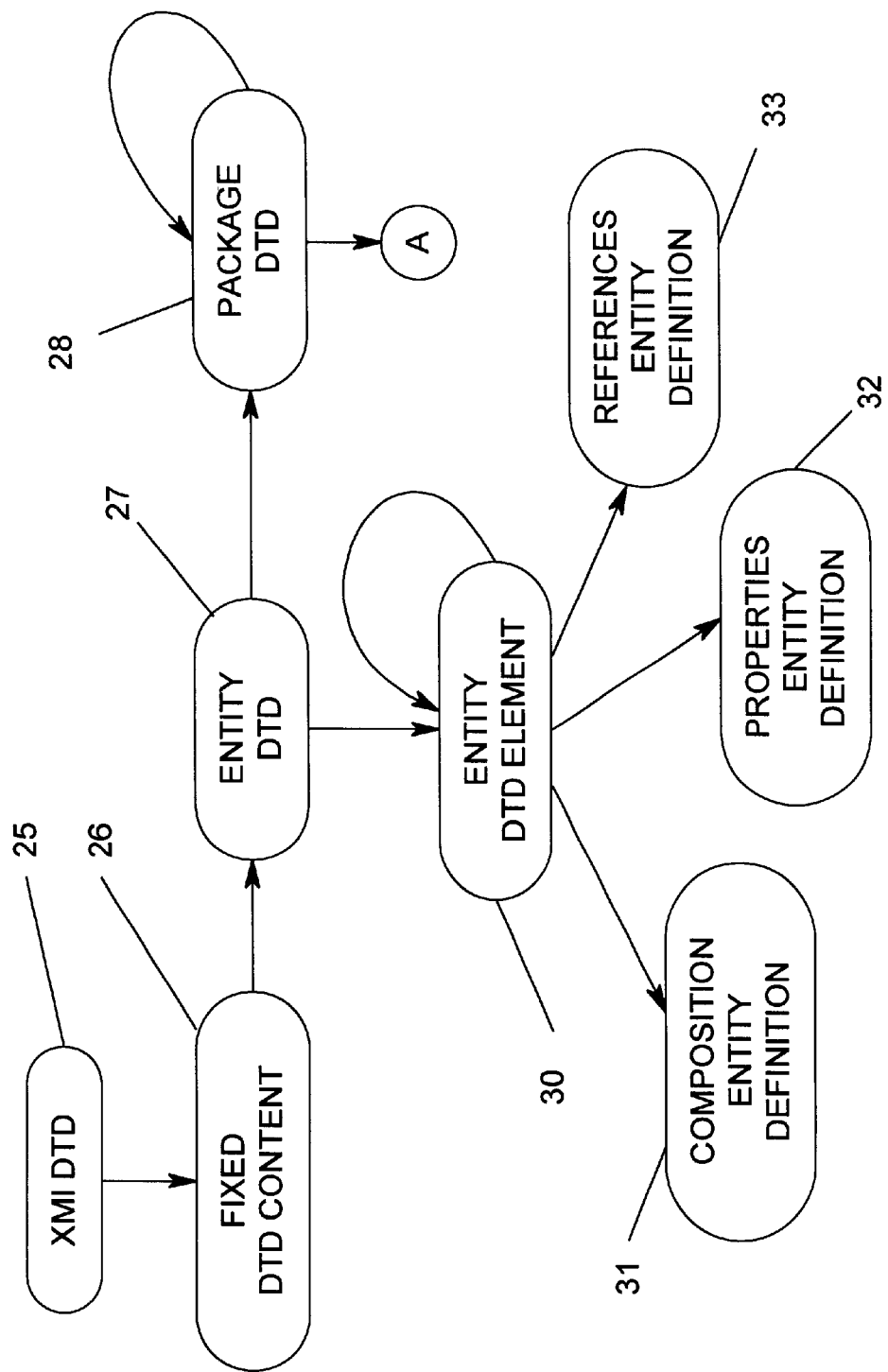
FIGS. 3A, 3B and 3C illustrate a hierarchy of the meta-syntactic variables for generating an XML DTD by applying the present invention.

Referring now to FIG. 3A, the first of a three-part diagram illustrating the grammar used to produce the DTD by the method of this invention is shown. This diagram shows the hierarchy of meta-syntactic variables of which all the XMI DTD's produced by the method of the present invention are syntactic instances. In the description that follows, the term "DTD" is used as an abbreviation of the proper term, which is "DTD fragment".

An XMI DTD 25 comprises a Fixed DTD content 26 and an Entity DTD 27, followed by one or more Package DTD's 28 for the outermost MOF Packages in the meta-model 20. The Fixed Content 26 is a fixed string of text as defined in the OMG XMI Recommendation (XML Metadata Interchange (XMI), OMG Document ad/98-10-05). A Package DTD 28 comprises the DTD fragments for the items in a MOF Package in the meta-model 20. Each Package DTD 28 comprises zero (in theory; in practice the value is one) or more Package DTD Elements 29 (FIG. 3B, connector A).

The Entity DTD 27 further includes one or more Entity DTD Elements 30. The Entity DTD Element 30 comprises a Composition Entity Definition 31, a Properties Entity Definition 32 and a References Entity Definition 33.

Figure 3B:
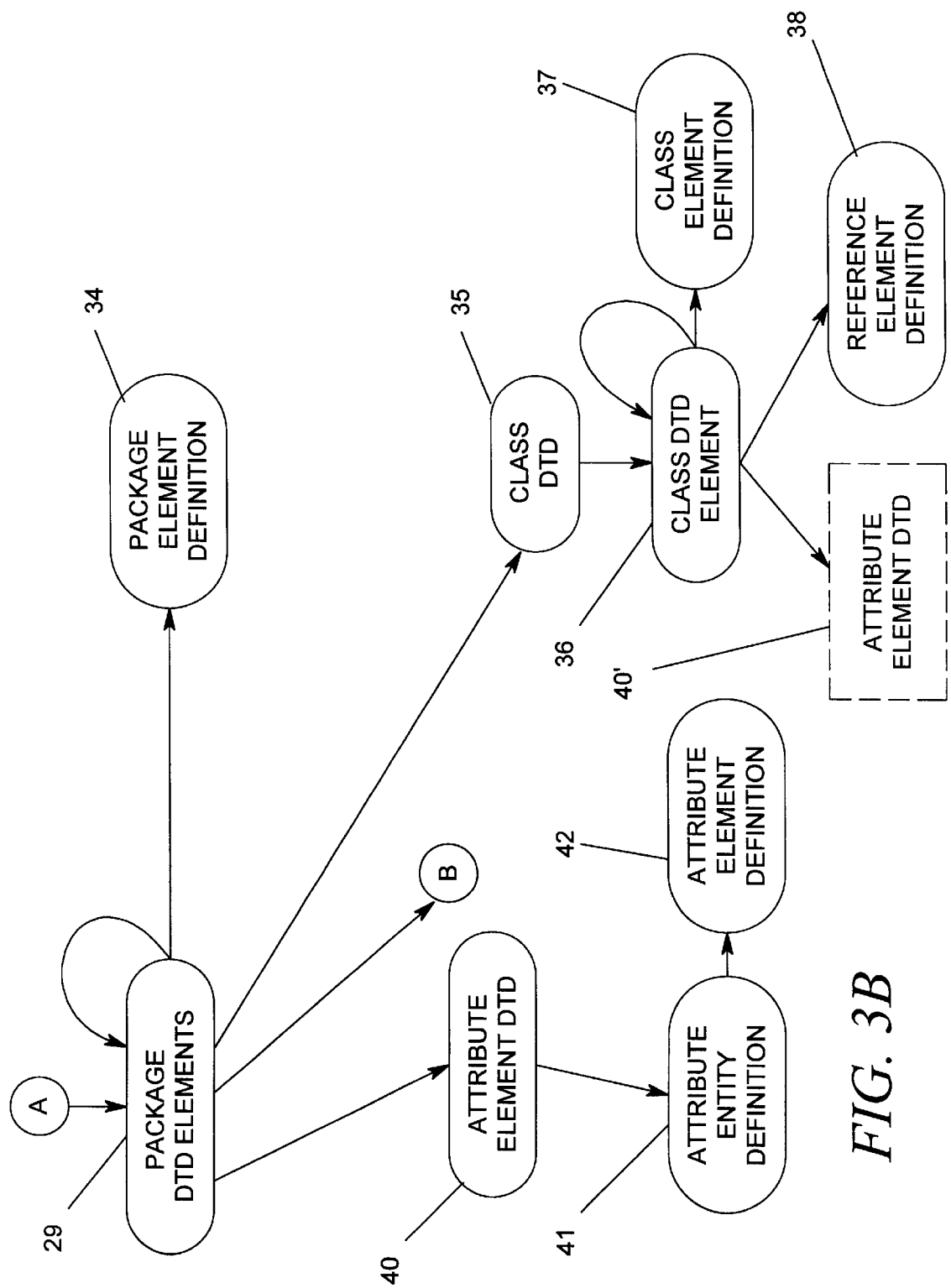

Referring now to FIG. 3B at the connector A, the Package DTD Elements 29 are followed by a Package Element Definition 34, which produces the XML element definition for a MOF Package in the meta-model 20. The Package DTD Elements 29 include a Class DTD 35, which comprises DTD fragments of the items in a MOF Class in the meta-model 20. Each Class DTD 35 includes zero (in theory; in practice the value is one) or more Class DTD Elements 36, followed by a Class Element Definition 37. The Class DTD Element 36 is either a Reference Element Definition 38 or an Attribute Element DTD 40'. The Reference Element Definition 38 produces the XML element definition for the MOF References made by a MOF Class in the meta-model 20 and the Attribute Element DTD 40 ' is a recursive use of the Attribute Element DTD 40 and is not further discussed; and, the Class Element Definition 37 produces the XML element definition for a MOF Class in the meta-model 20.

The Package DTD Elements 29 also includes an Attribute Element DTD 40, which may be an Attribute Entity Definition 41 followed by an Attribute Element Definition 42. The Attribute Entity Definition 41 is an XML entity that specifies an enumerated set of values which an Attribute may have. The Attribute Element Definition 42 produces the XML element definition for the MOF Classes that are owned by other MOF Classes in the meta-model 20.

Figure 3C:
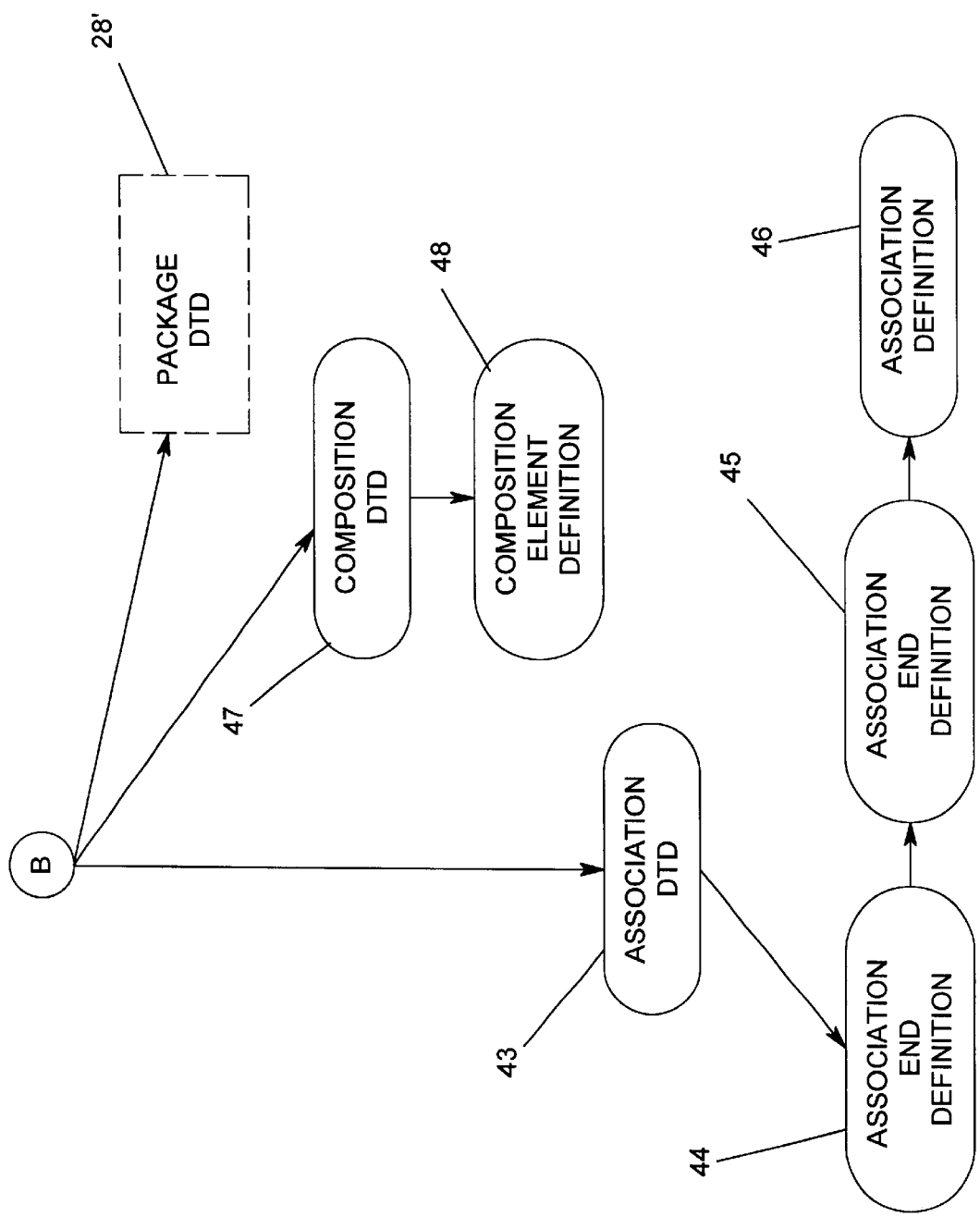

Referring now to FIG. 3C at a connector B, the Package DTD Elements 29 further includes a Package DTD 28' and an Association DTD 43 that includes the DTD fragments of an un-referenced Association in the meta-model 20. The Package DTD 28' is a recursive use of the Package DTD 28 and is not further discussed. Each Association DTD 43 comprises two Association End Definitions 44 and 45, followed by an Association Definition 46. The Association End Definition 4 5 produces the XML element definition for an un-referenced AssociationEnd in the meta-model 20. The Association Definition 46 produces the XML element definition for an un-referenced Association in the meta-model 20.

With reference back to the connector B, the Package DTD Elements 29 also includes a Composition DTD 47 which comprises a Composition Element Definition 48. The Composition Element Definition 48 produces the XML element definition for the MOF Classes which are owned by other MOF Classes in the meta-model 20.

In the descriptions of flow charts that follow, terms such as "Package", "Class", "Attribute", etc., are capitalized to indicate that they are specific types of metamodel objects.

Figure 4:
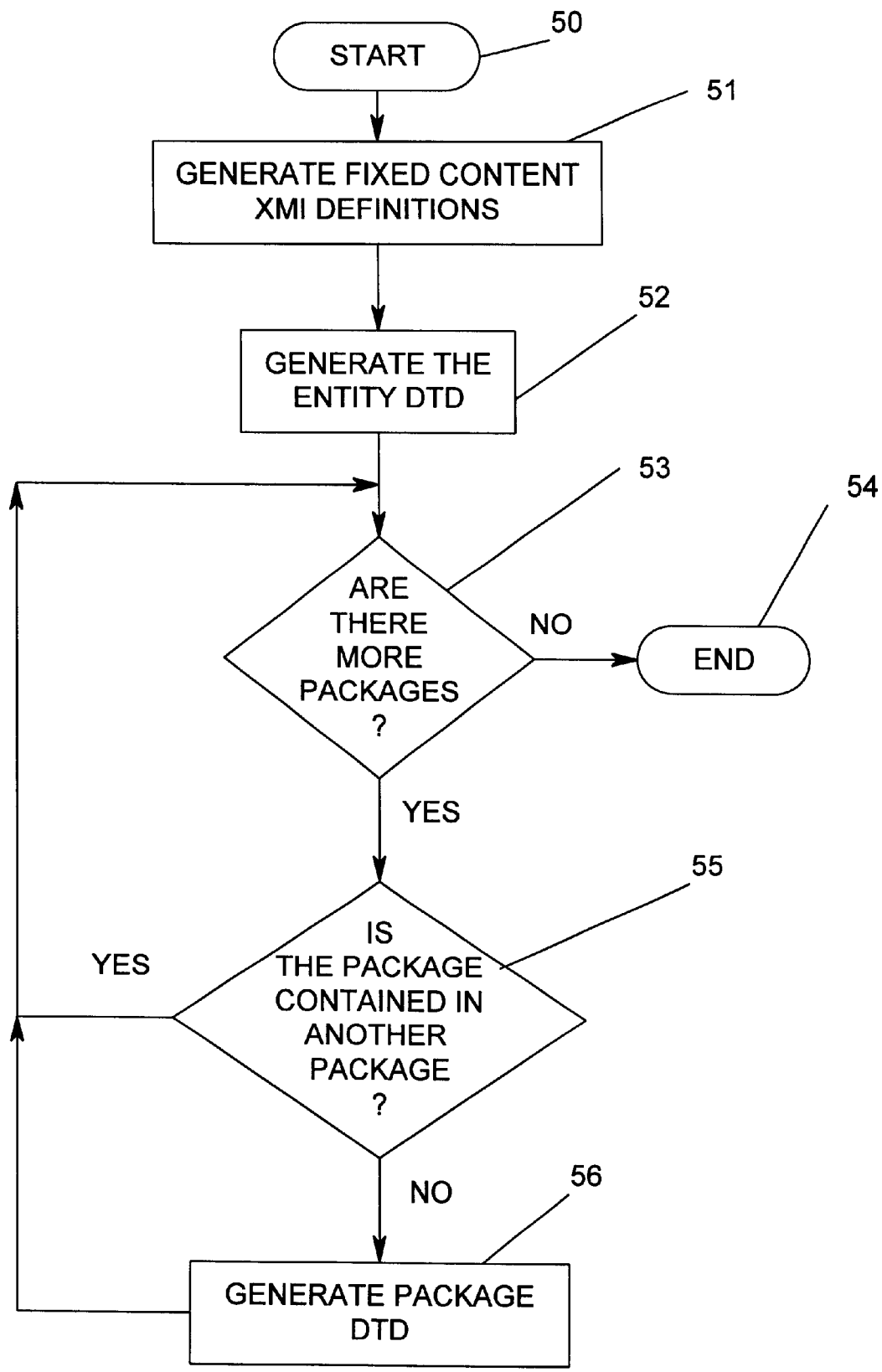
FIG. 4 is a flow chart of the DTD generation process.

Referring now to FIG. 4, a flow chart of the overall DTD generation process is shown. The process begins with a start bubble 50 followed by a step of generating the fixed content XMI Definitions (block 51). Next, the Entity DTD 28 is generated (block 52). After this, an inquiry is made as to whether or not there are more Packages (diamond 53). If the answer to this inquiry is no, then the process ends (bubble 54). On the other hand, if there are more Packages then another inquiry is made as to whether or not the Package is contained in another Package (diamond 55). If the answer to this inquiry is yes, then a return is made back to the diamond 53 for processing the next Package. On the other hand, if the answer to this inquiry is no, then a Package DTD 28 is generated (block 56). After this step has been performed a return is made back to the diamond 53 for processing the next Package.

Figure 5A:
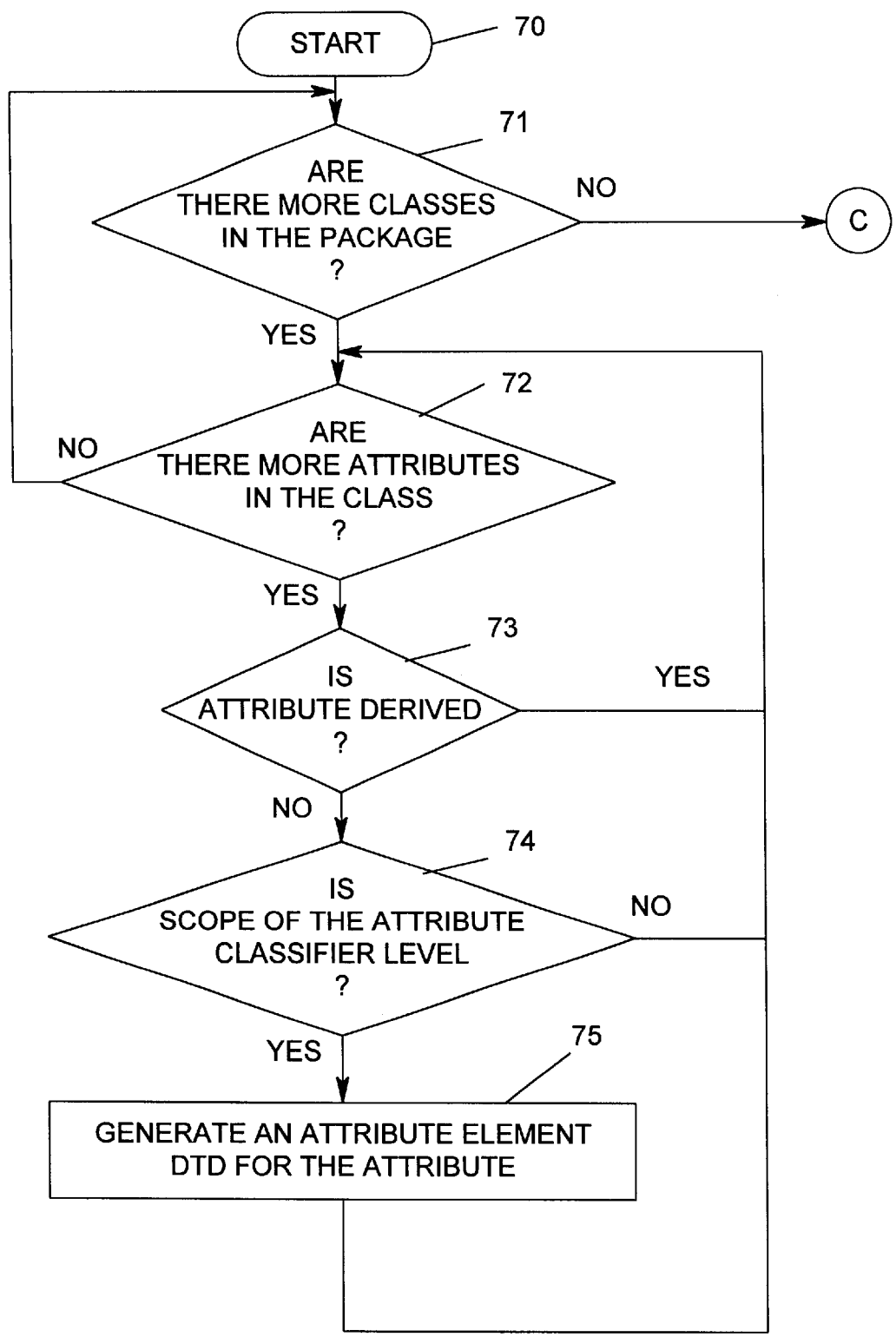
FIG. 5A, 5B and 5C combined form a flow chart of the Package DTD generation process.
Figure 5B:
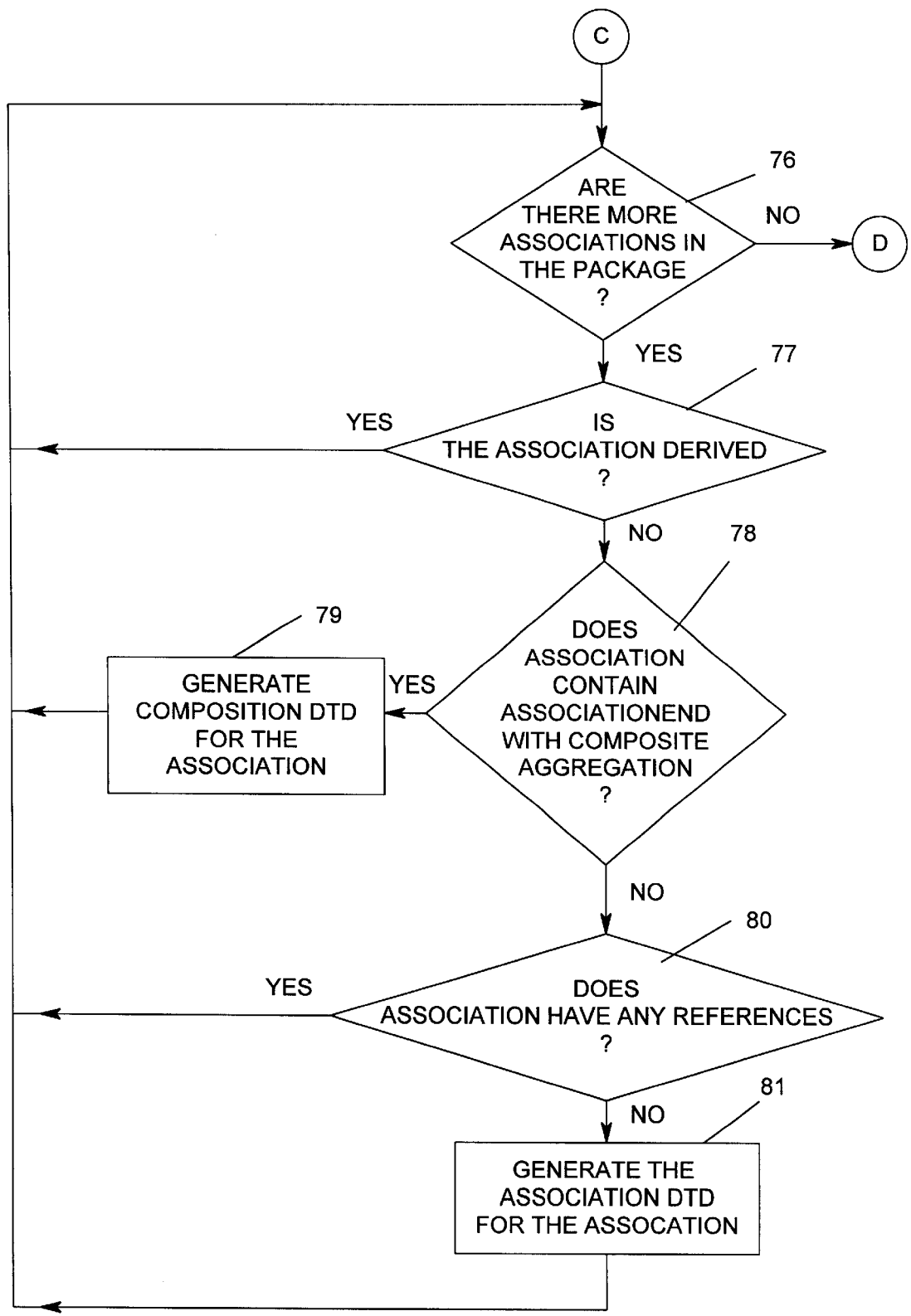
Figure 5C:
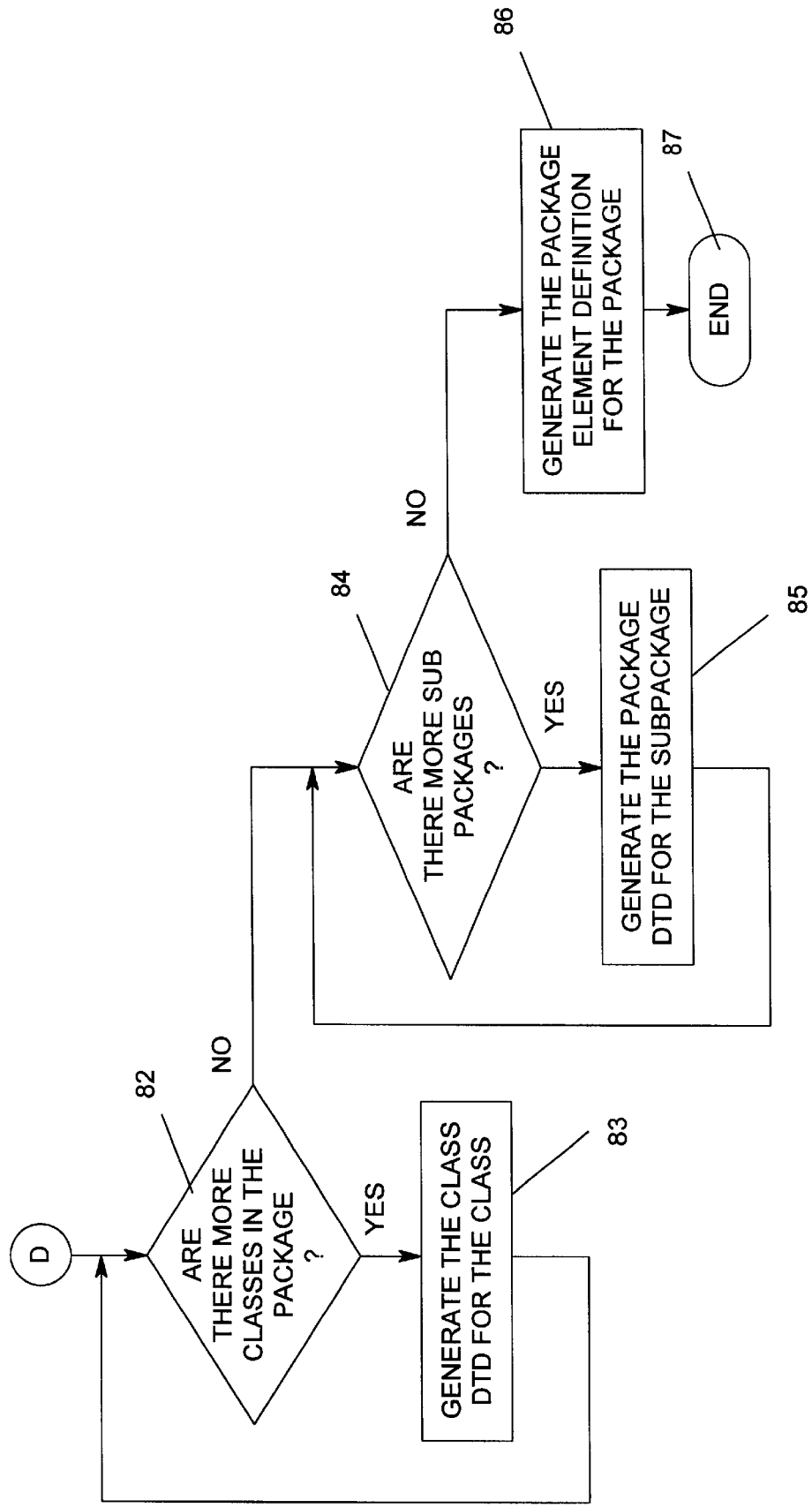

Referring now to FIGS. 5A, 5B and 5C, a flow chart of the Package DTD 28 or 28' generation process is shown. The process begins with a start bubble 70, followed by an inquiry as to whether or not there are more Classes in the Package (diamond 71). If the answer to this inquiry is no, then a branch is made (via a connector C) to a later part of the process illustrated in FIG. 5B and described hereinafter. On the other hand, if the answer to this inquiry is yes, then another inquiry is made as to whether or not there are more Attributes in the Class (diamond 72). If the answer to this inquiry is no, then a return is made back to the diamond 71.

On the other hand, if the answer to the inquiry in the diamond 72 is yes, then yet another inquiry is made as to whether or not the Attribute is derived (diamond 73). If the answer to this inquiry is yes, then a return is made back to the diamond 72. On the other hand, if the answer to this inquiry is no, then another inquiry is made as to whether or not the scope of the Attribute is classifier level (diamond 74). If the answer to this inquiry is no, then a return is made back to the diamond 72. On the other hand if the answer to this inquiry is yes, then an Attribute Element DTD 40 for the Attribute is generated (block 75). Upon completion of the preceding step a return is made back to the diamond 72.

Referring now to FIG. 5B at the connector C, an inquiry is made as to whether or not there are more Associations in the Package (diamond 76). If the answer to this inquiry is no then a branch is made (via a connector D) to a later part of the process illustrated in FIG. 5C and described hereinafter.

On the other hand, if the answer to this inquiry is yes, then another inquiry is made as to whether or not the Association is derived (diamond 77). If the answer to this inquiry is yes, then a branch is made back to the diamond 76. On the other hand, if the answer to this inquiry is no, then another inquiry is made as to whether or not Association contains an AssociationEnd with composite aggregation (diamond 78). If the answer to this inquiry is yes, then a Composition DTD 47 is generated for the Association (block 79). After this step a branch is made back to the diamond 76.

If the answer to the inquiry in the diamond 78 is no, then yet another inquiry is made as to whether or not the Association has any References (diamond 80). If the answer to this inquiry no, then the Association DTD 43 is generated for the Association (block 81). Upon completion of this step, or if the answer to the inquiry in the diamond 80 is yes, then a branch is made back to the diamond 76.

Referring now to FIG. 5C at the connector D, an inquiry is made as to whether or not there are more Classes in the Package (diamond 82). If the answer to this inquiry is yes, then the Class DTD 35 for the Class is generated (block 83). On the other hand, if the answer to this inquiry is no, then yet another inquiry is made as to whether or not there are more sub-Packages (diamond 84). If the answer to this inquiry is yes, then the Package DTD 28' for the sub-Package is generated (block 85) and a return is made back to the top of the diamond 84. On the other hand, if the answer to this inquiry is no, then the Package Element Definition 34 for the Package is generated (block 86) and the process ends (bubble 87).

Figure 6A:
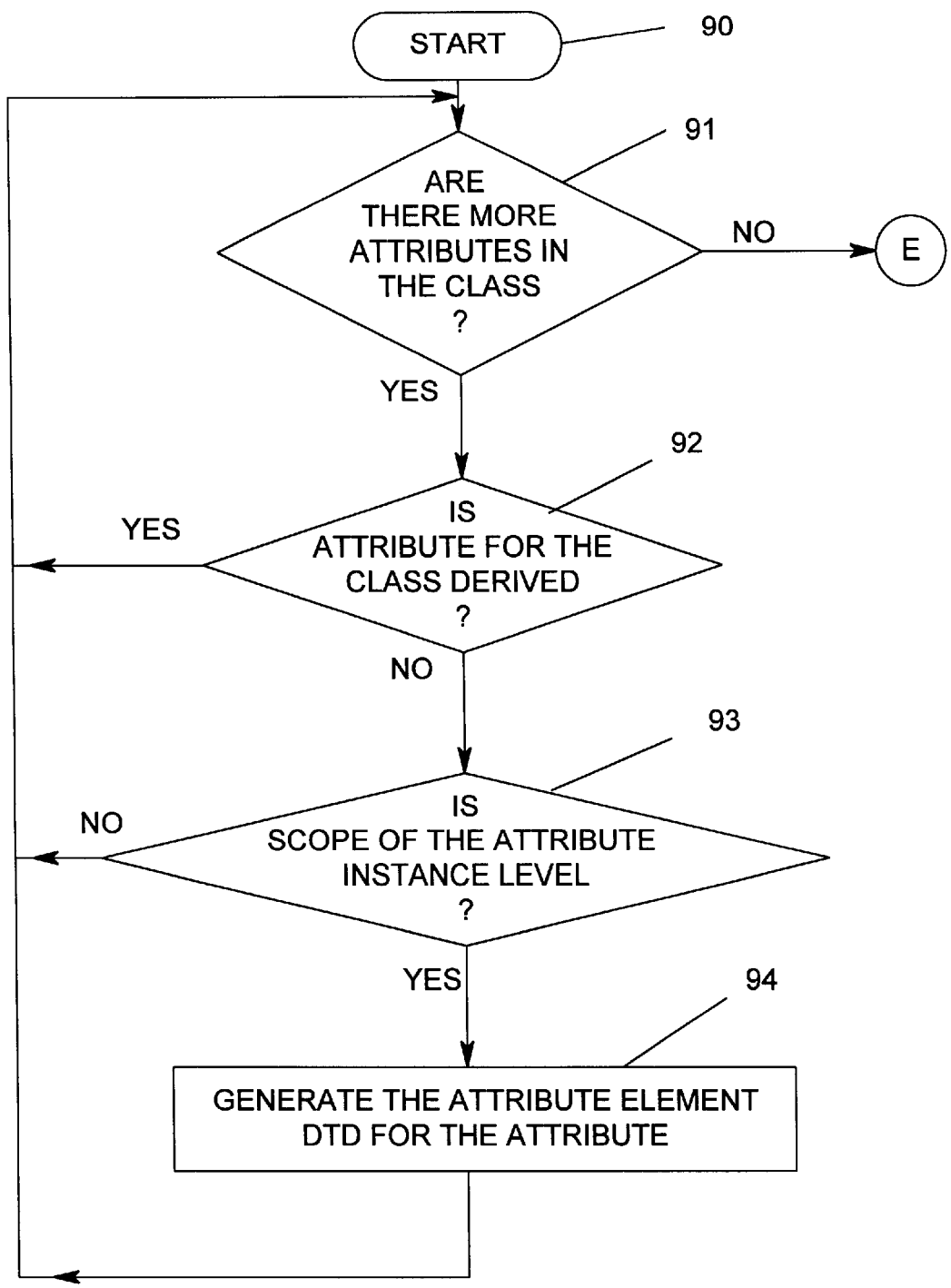
FIG. 6A and 6B combined form a flow chart of the Class DTD generation process.
Figure 6B:
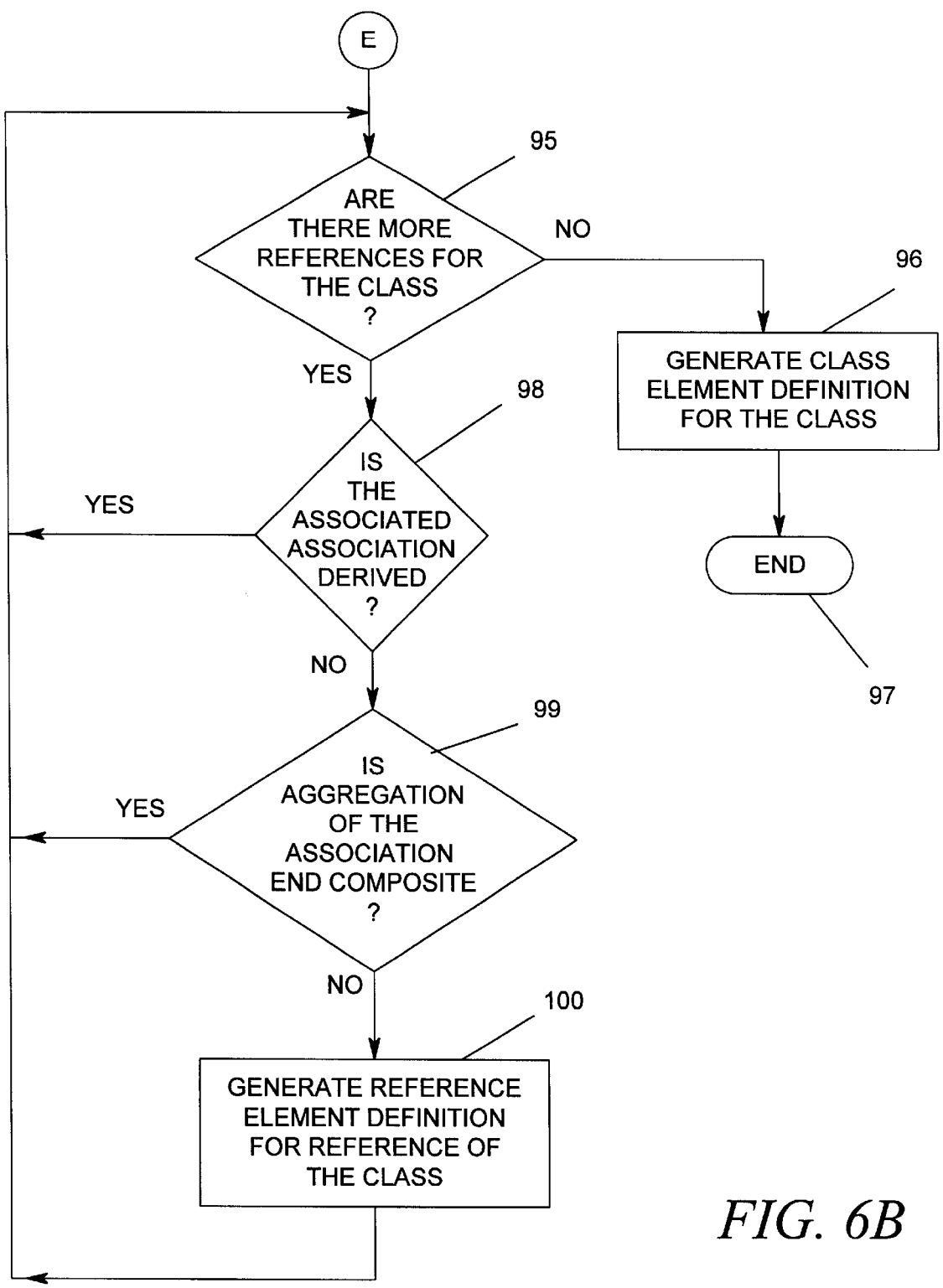

Referring now to FIGS. 6A and 6B, a flow chart of the Class DTD 35 generation process is illustrated. The process begins with a start bubble 90 followed by an inquiry as to whether or not the there are more Attributes in the Class (diamond 91). If the answer to this inquiry is no, then a branch is made (via a connector E) to a later portion of the process illustrated in FIG. 6B and described hereinafter. On the other hand, if the answer to this inquiry is yes, then another inquiry is made as to whether or not the Attribute is derived (diamond 92). If the answer to this inquiry is yes, then a return is made back to the top of the diamond 91. On the other hand, if the answer to this inquiry is no, then another inquiry is made as to whether or not the scope of the Attribute is instance level (diamond 93). If the answer to this inquiry is no, then a return is made back to the top of the diamond 91. On the other hand, if the answer to this inquiry is yes, then the Attribute Element DTD 40' for the Attribute is generated (block 94). Upon completion of this step a return is made back to the diamond 91 for processing the next Attribute in the Class.

Referring now to FIG. 6B at the connector E, an inquiry is made as to whether or not there are more References for the Class (diamond 95). If the answer to this inquiry is no, then the Class Element Definition 37 for the Class is generated (block 96) and the process ends (bubble 97). On the other hand, if the answer to this latter inquiry is yes, then still another inquiry is made as to whether or not the associated Association is derived (diamond 98). If the answer to this inquiry is yes, then a branch is made back to the top of the diamond 95. On the other hand, if the answer to this latter inquiry is no, then another inquiry is made as to whether or not the aggregation of the AssociationEnd is composite (diamond 99). If the answer to this inquiry is yes, then a branch is made back to the to of the diamond 95. On the other hand, if the answer is no, then the Reference Element Definition 38 for the Reference of the Class is generated (block 100). Upon completion of this step a return is made back to the diamond 95 for processing the next Reference for the Class.

Figure 7:
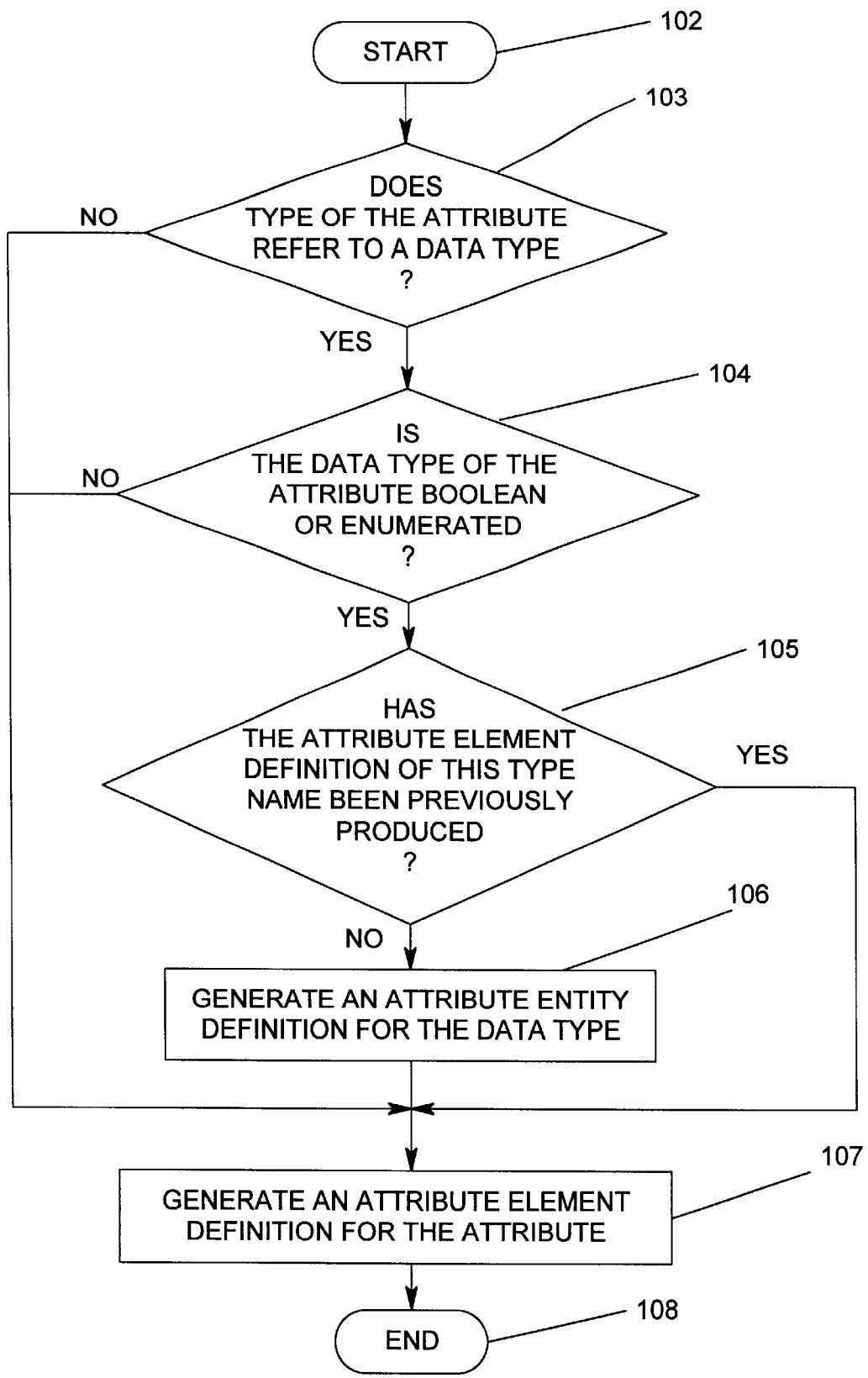
FIG. 7 is a flow chart of the Attribute Element DTD process.

Referring now to FIG. 7, a flow chart of the Attribute Element DTD 40 process is shown. The process begins with a start bubble 102 followed by an inquiry as to whether or not the type reference of the Attribute refers to a data type (diamond 103). If the answer to this inquiry is yes, then another inquiry is made as to whether or not the data type of the Attribute is Boolean or Enumerated (diamond 104). If the answer to this inquiry is yes, then yet another inquiry is made as to whether or not the Attribute Entity Definition 41 of this type name has been previously produced (diamond 105). If the answer to this inquiry is no, then an Attribute Entity Definition 41 for the data type is generated (block 106). On the other hand, if the answer to the inquiry in the diamond 105 is yes, or upon completion of the step depicted by the block 106, an Attribute Element Definition 42 for the Attribute is generated (block 107) and the process ends (bubble 108). If the answer to the inquiry in the diamond 103 or 104 is no, then the remainder of the process is skipped down to the block 107 for generation of an Attribute Element Definition 42 for the Attribute.

Figure 8:
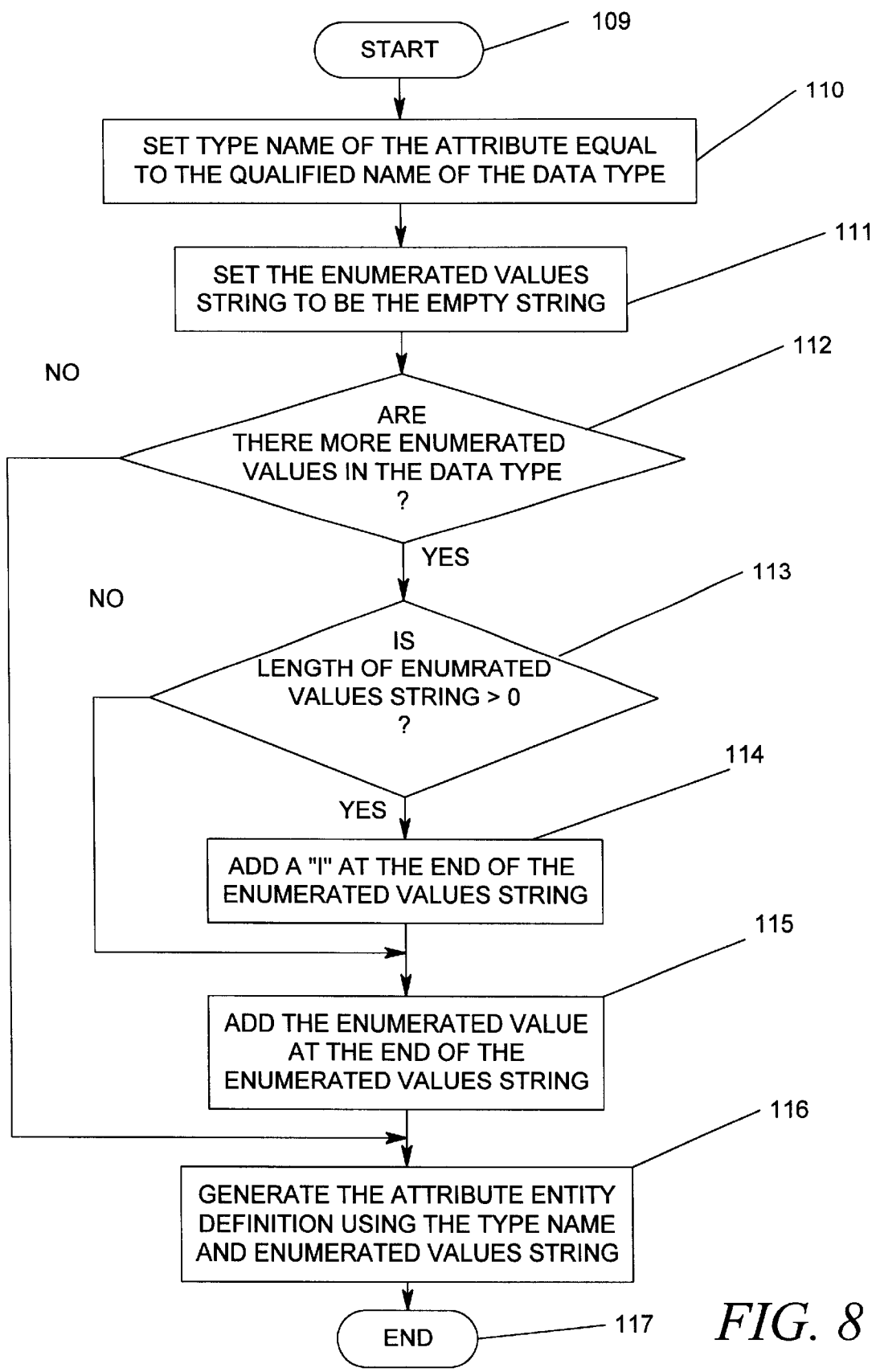
FIG. 8 is a flow chart illustrating the Attribute Entity Definition process.

Referring now to FIG. 8, a flow chart of the process for generating the Attribute Entity Definition 41 is shown. The process begins with a start bubble 109 followed by a step of setting the type name of the Attribute equal to the qualified name of the data type (block 110). Next, the enumerated values string is set to be the empty string (block 111). After this, an inquiry is made as to whether or not there are more enumerated values in the data type (diamond 112). If the answer to this inquiry is no, then a branch is made to a later part of this process and will be described further hereinafter. On the other hand, if the answer to this inquiry is yes then another inquiry is made as to whether or not the length of the enumerated values string is greater than zero (diamond 113).

If the answer to the inquiry in the diamond 113 is yes, then a vertical bar ("|") is added at the end of the enumerated values string (block 114). Next, the enumerated value is added at the end of the enumerated values string (block 115). If the answer to the inquiry in the diamond 113 is no, then a branch is made to the block 115. After the above, the XML entity definition is generated using the type name and enumerated values string (block 116) and the process ends (bubble 117). If the answer to the inquiry in the diamond 112 is no, then a branch is made to the block 116.

Figure 9:
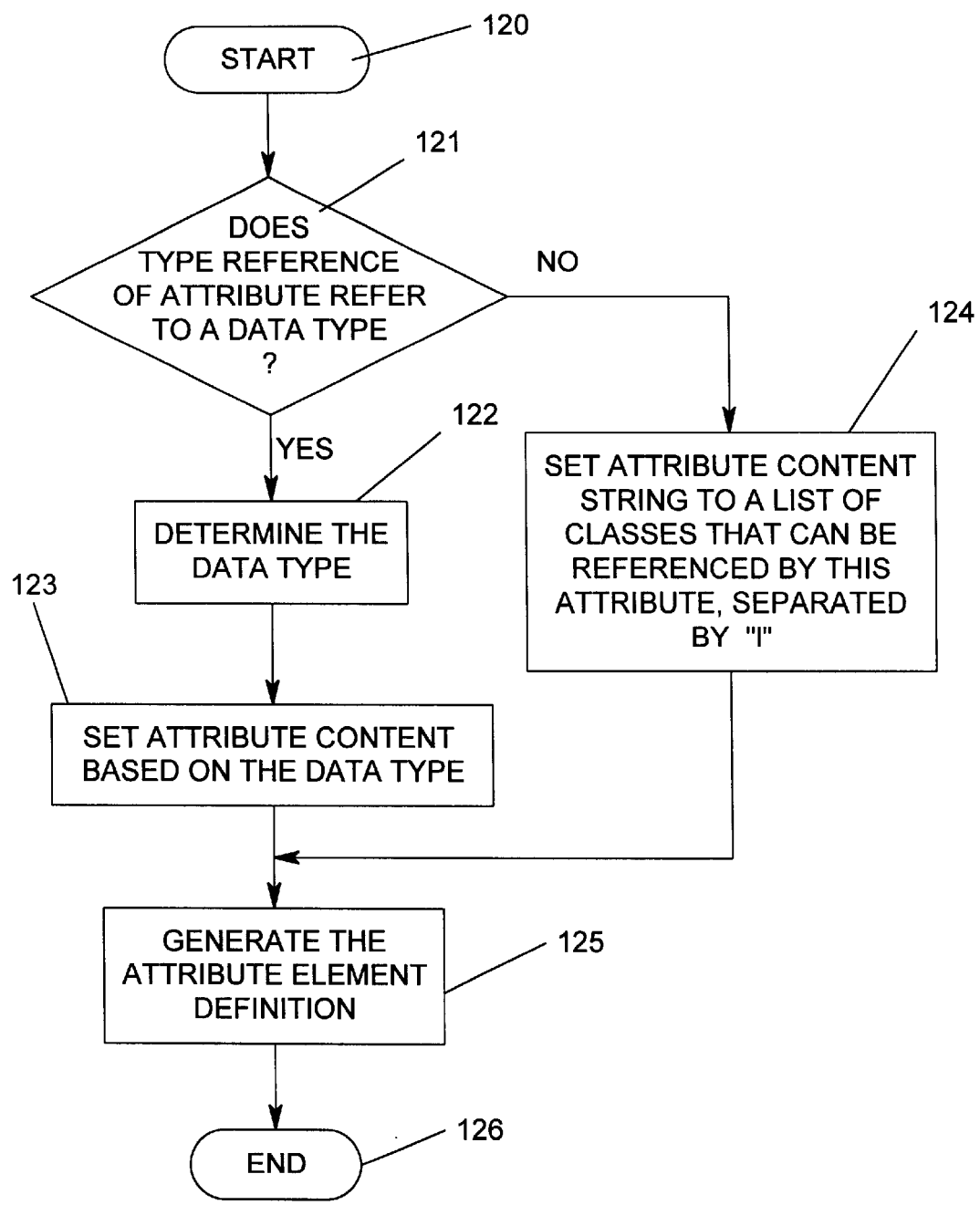
FIG. 9 is a flow chart illustrating the Attribute Element Definition process.

Referring now to FIG. 9, a flow chart of the Attribute Element Definition 42 process is shown. The process begins with a start bubble 120 followed by an inquiry as to whether or not the type reference of the Attribute refers to a data type (diamond 121). If the answer to this inquiry is yes, then the data type is determined (block 122) after which the attribute content is set equal to the type reference (block 123). On the other hand, if the answer to the inquiry in the diamond 121 is no, then the Attribute content string is set equal to a list of Classes that can be referenced by this Attribute, which is the Class named in the type Reference and all of its sub-Classes, separated by vertical bars ("|") (block 124). Upon completion of this last step, or upon completion of the step depicted by the block 123, the XML element definition for the attribute is generated (block 125) and the process ends (bubble 126).

Referring now to FIG. 1A, the first of a two-sheet drawing of the flow chart for the Class Element Definition 37 process is shown. The process begins with a start bubble 130 followed by a step of defining a class name string with a value of the qualified name of the Class (block 131). Next, a properties string is defined to contain invocations of the properties entity definitions of the Class and its parent Classes, separated by commas, indicating that all must be present in the XML document (block 132). Next, a references string is defined to contain the invocations of the reference entities for the Class and its parent Classes, separated by commas (block 133). After this, an inquiry is made as to whether or not the length of the references string is greater than zero (diamond 134). If the answer to this inquiry is yes, then the string, "XMI.extension" & "*" & "," (where the ampersand character indicates string concatenation), is inserted at the beginning of the references string value and the result is enclosed in parentheses (block 135). On the other hand, if the length of the References is not greater than zero, then the References string value is set to be "(" & "XMI.extension" & "*" & ")" (block 136). Following the above, the process illustration continues in FIG. 10B as denoted by a connector F.

Figure 10A:
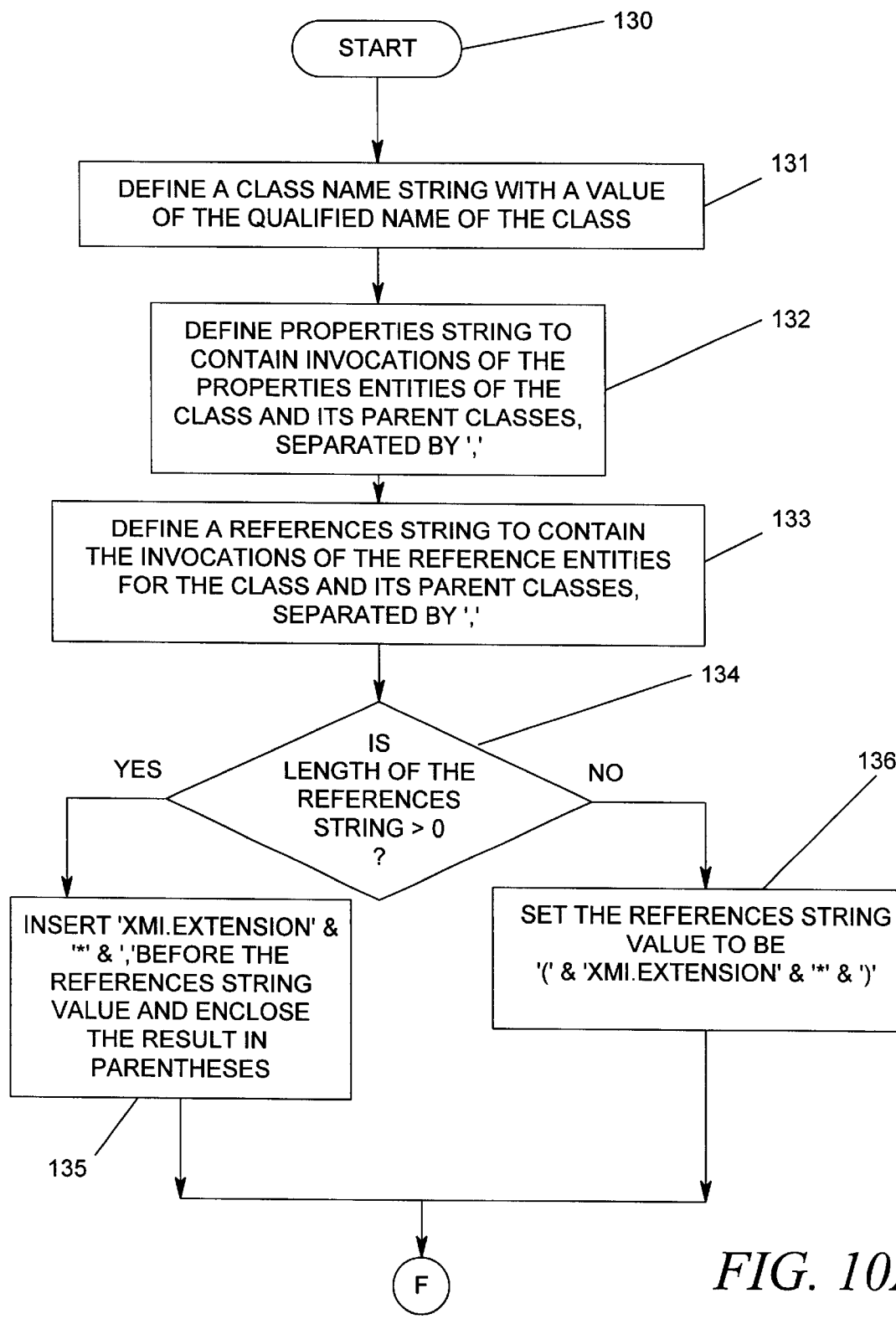
FIGS. 10A and 10B combined form a flow chart of the Class Elements Definition process.
Figure 10B:
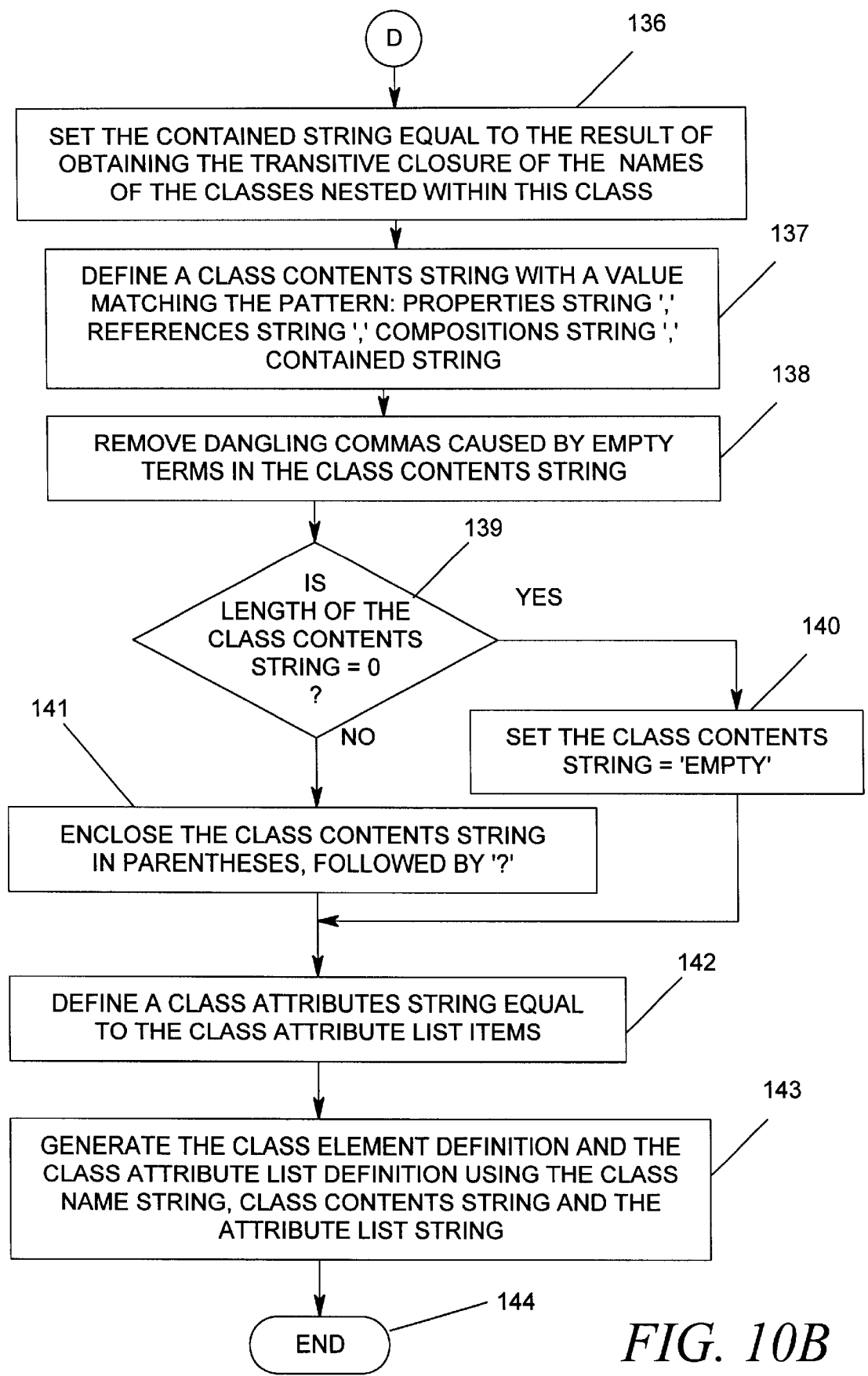

Referring now to FIG. 10B at the connector F, the compositions string is defined to contain invocations of the compositions entities for the Class and its parent Classes, separated by commas (","), (block 137). Next, a contained string is defined to contain the names of the Classes contained in the Class and its parent Classes, separated by commas (block 138). After this, a Class contents string whose contents are created in the pattern: properties string "," references string "," composition string "," contained string is defined (block 139). Some of these strings might be empty. Hence, the dangling commas caused by empty terms in class contents are removed (block 140). Next, the Class contents string is enclosed in parentheses and appended with '?' (block 141). A class attribute list items string is defined to contain the Attribute string for the Class (block 142). Following the above, the XML element definition for the Class is generated using the class names, class contents and class attribute list items strings (block 143) and the process ends (bubble 144).

Figure 11:
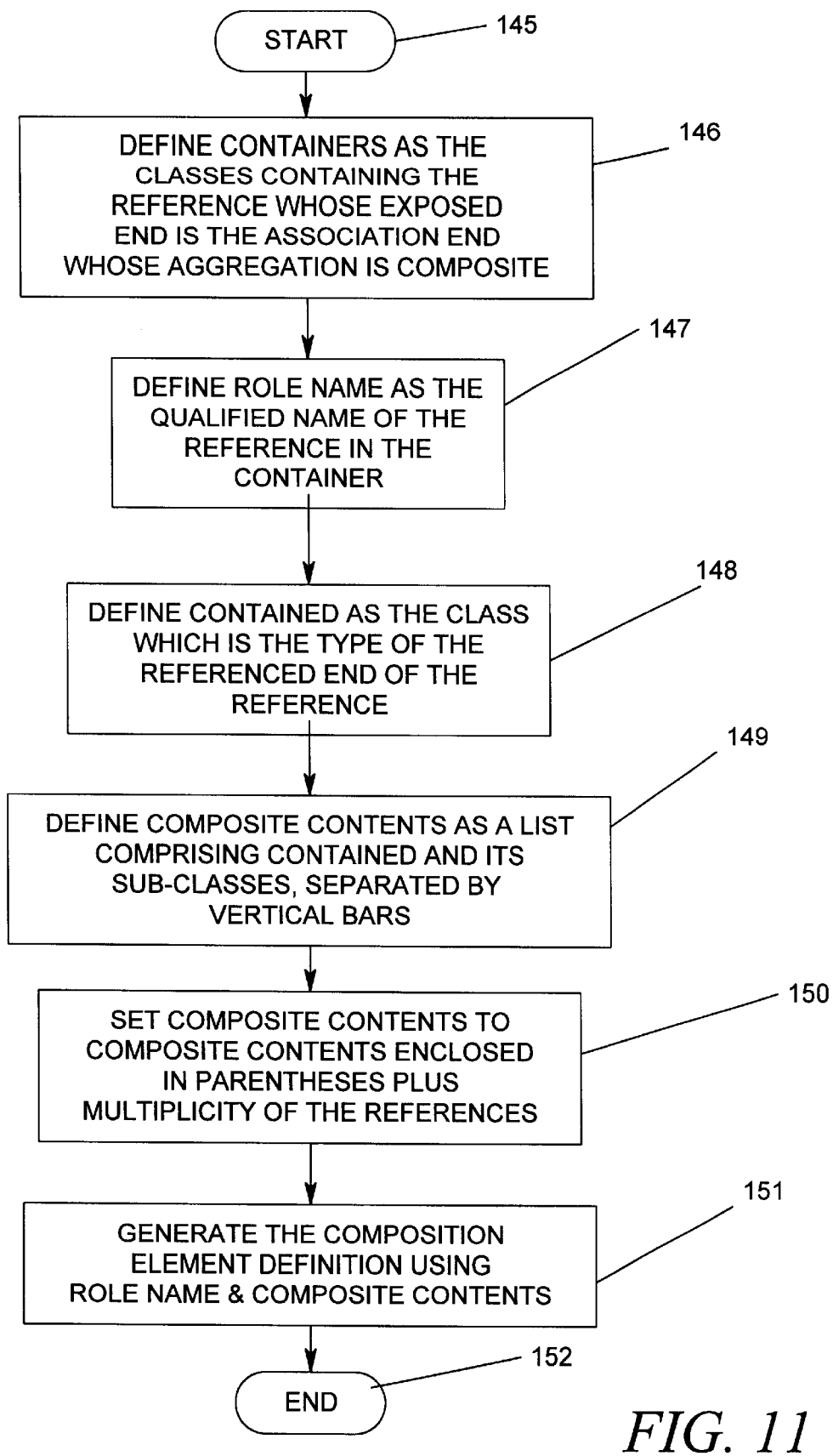
FIG. 11 is a flow chart of the Composition Element Definition process.

Referring now to FIG. 11, a flow chart of the Composition Element Definition 48 process is shown. The process begins with a start bubble 145 followed by a step of defining a variable, container, as the Class containing the Reference whose exposed end is the AssociationEnd whose aggregation is composite (block 146). Next, the role name is defined as the qualified name of the Reference in container (block 147) and the variable, contained, is defined as the Class which is the type of the referenced end of the Reference (block 148).

The composite contents string is defined as a list comprising contained and its sub-Classes, and separated by vertical bars ("|") indicating that only one is used (block 149). Next, composite contents string is set to composite contents enclosed in parentheses plus the multiplicity of the Reference (block 150). After this, the XML element is generated for the composition element using the role name and composite contents strings (block 151) and the process ends (bubble 152).

Figure 12A:
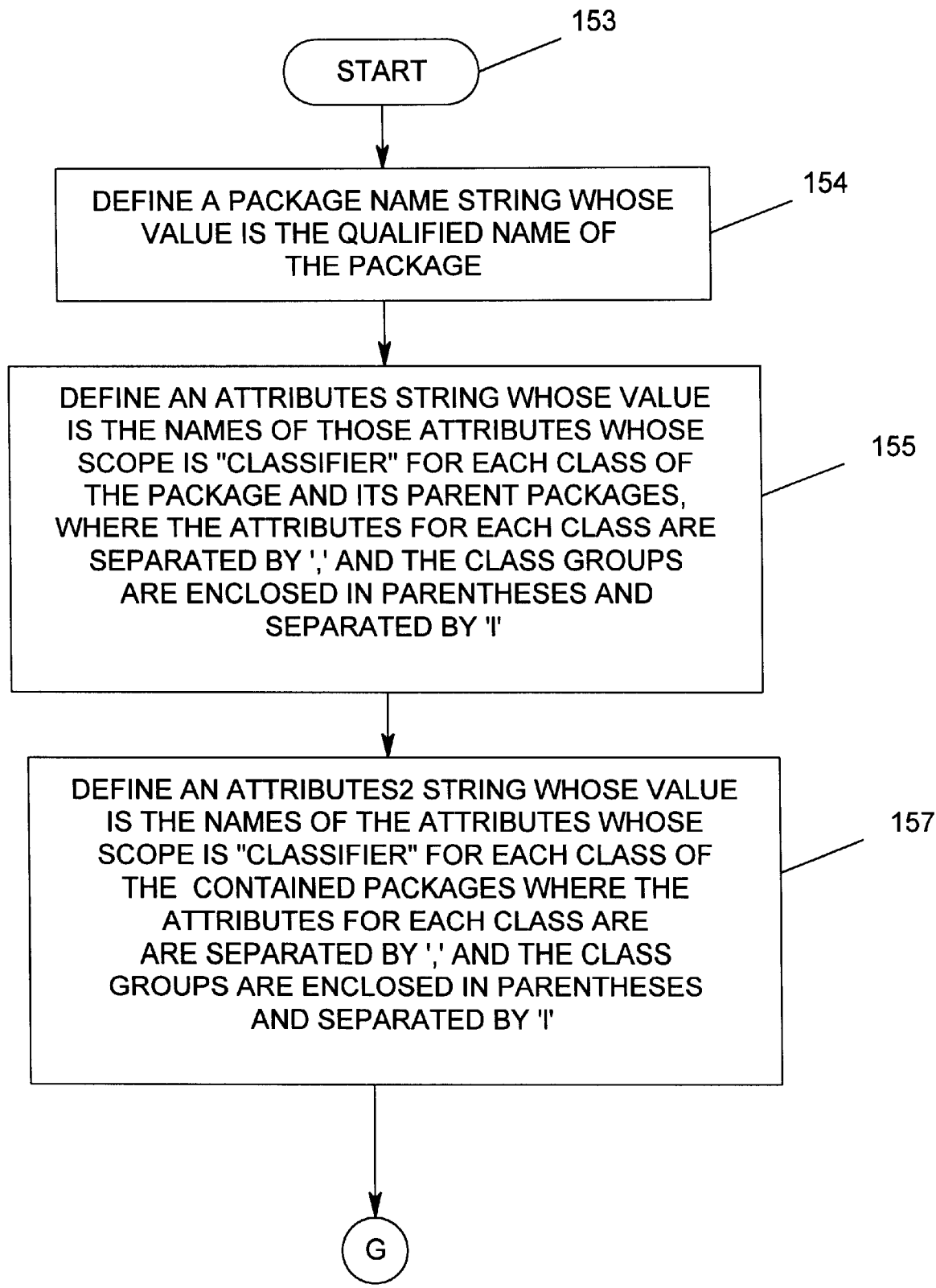
FIGS. 12A through 12C combined form a flow chart of the Package Element Definition process.

Referring now to FIG. 12A, the first of a three-sheet flow chart of the details of the Package Element Definition 33 is shown. The process begins with a start bubble 153 followed by a step of defining a package name whose value is the qualified name of the Package (block 154). Next, an attributes string is defined whose value is the names of those Attributes whose scope is classifier level for each Class of the Package and its parent Packages, where the Attributes for each Class are separated by commas ",", and the Class groups are enclosed in parentheses and separated by a vertical bar ("|") (block 155). After this, an attributes2 string is defined whose value is the names of the Attributes whose scope is classifier level for each Class of the Packages contained within this Package, where the Attributes for each Class are separated by commas ",", and the Class groups are enclosed in parentheses and separated by a vertical bar "|" (block 157). The process illustration continues in FIG. 12B as denoted by a connector G.

Figure 12B:
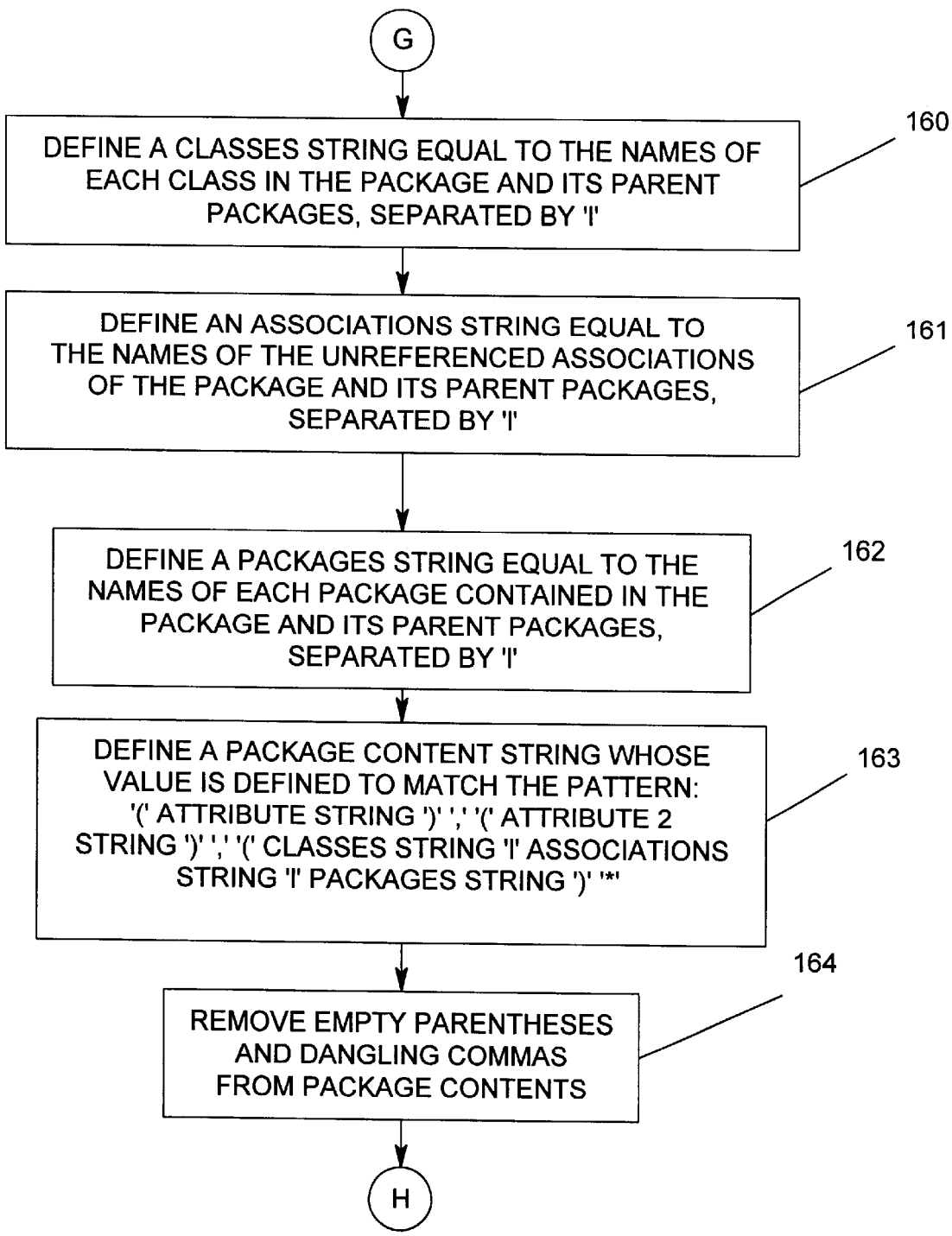

Referring now to FIG. 12B at the connector G, a classes string is defined equal to the names of each Class in the Package and its parent Packages, separated by a vertical bar "|" (block 160). Next, an associations string is defined equal to the names of the unreferenced Associations of the Package and its parent Packages, separated by a vertical bar "|" (block 161). A packages string is then defined equal to the names of each Package contained in the Package and its parent Packages, separated by a vertical bar "|" (block 162). After this, a package content string is defined whose value is defined to match the pattern: "(" attributes string ")" "," "(" attributes2 string ")" "," "(" classes string "|" associations string "|" package string ")" "*" (block 163). Since some of these strings might be empty, there might be empty parentheses and dangling commas in the package content string. The empty parentheses and dangling commas are next removed from the package content string (block 164). The process illustration continues in FIG. 10C at a connector H.

Figure 12C:
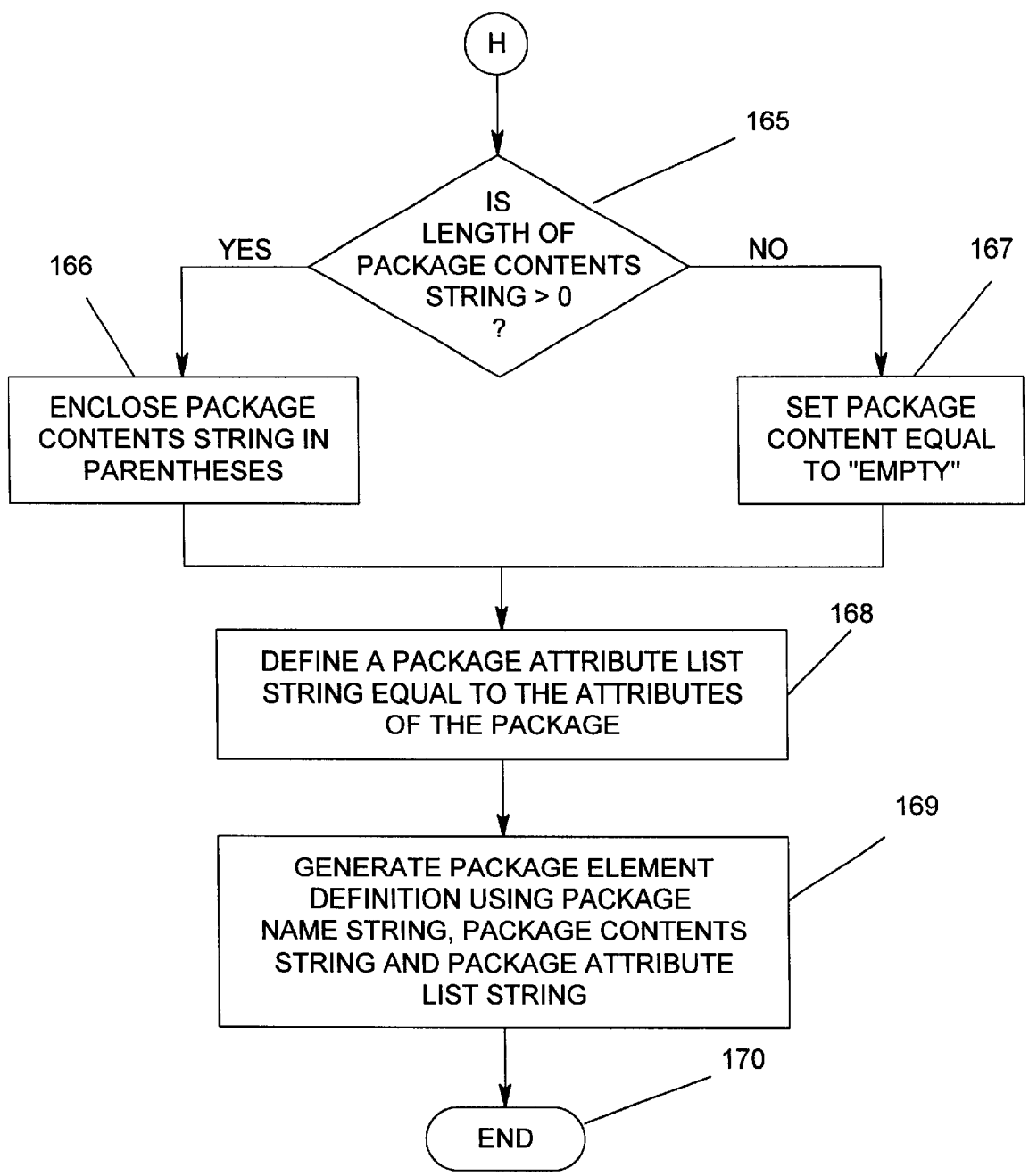

Referring now to FIG. 12C at the connector H, an inquiry is made as to whether or not the length of the package content string is greater than zero (diamond 165). If the answer to this inquiry is yes, then the package content string is enclosed in parentheses (block 166). On the other hand, if the answer to this inquiry is no, then the package content is set equal to "EMPTY" (block 167). Upon completion of either of the steps depicted by the block 166 or 167, a Package attribute list string is defined equal to the XML attributes of the Package (block 168). After this, the XML element definition for the Package is generated using package name string, package contents string and package attribute list string (block 169), and the process ends (bubble 170).

Figure 13:
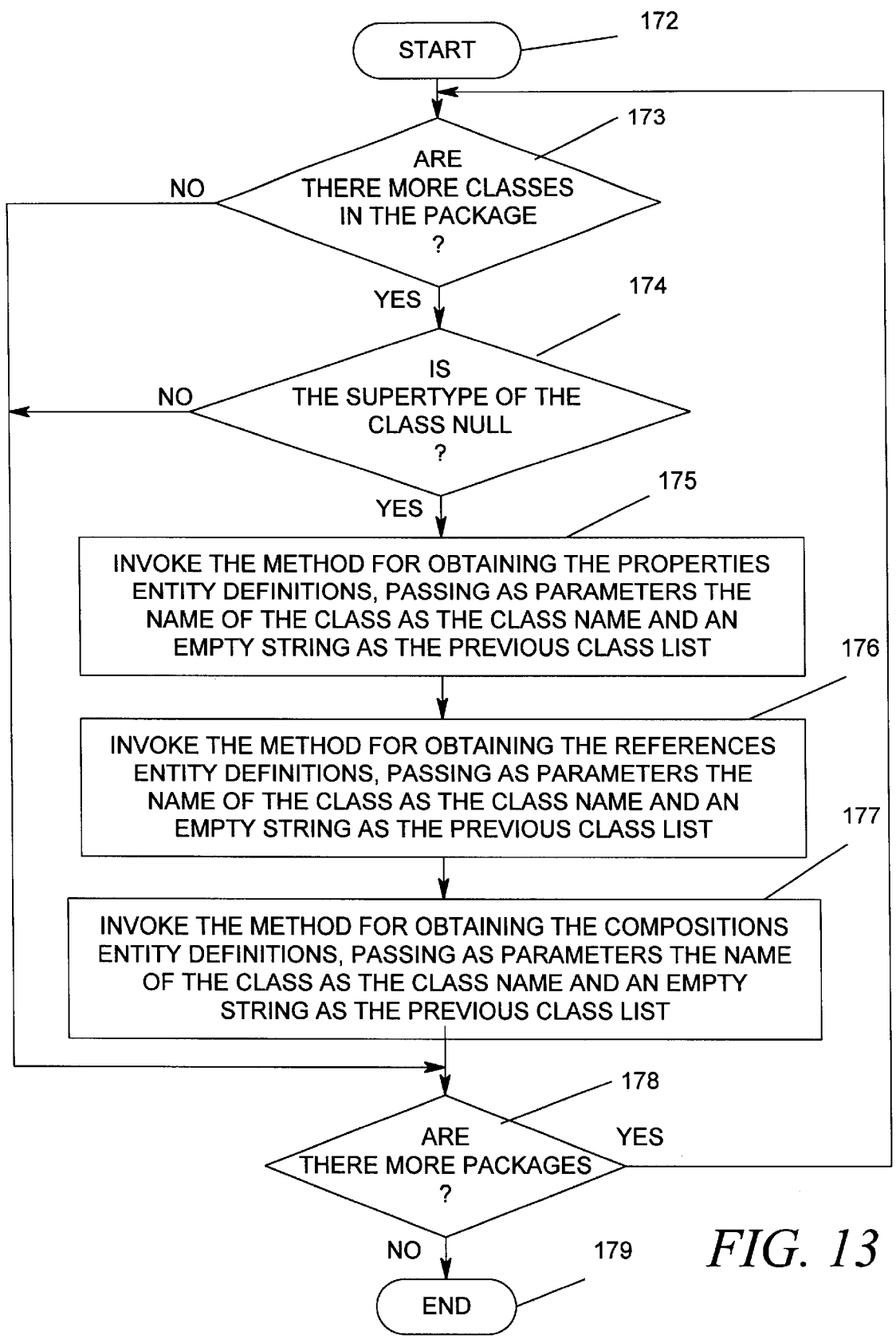
FIG. 13 is a flow chart of the Entity DTD process.

Referring now to FIG. 13, a flow chart of the Entity DTD 27 process is shown. The process begins with a start bubble 172 followed by an inquiry as to whether or not there are more Classes in the Package (diamond 173). If the answer to this inquiry is no, then a branch is made to a latter part of the process and will be explained hereinafter. On the other hand, if the answer to this inquiry is yes, then another inquiry is made as to whether or not the super type, i.e. parent Class of the Class is null (diamond 174). If the answer to this inquiry is no, then a branch is made to a latter part of the process. On the other hand, if the answer is yes, then the method for obtaining the Properties Entity Definitions 32 is invoked, passing as parameters the Class and an empty string as the previous Class list (block 175).

The method for obtaining the References Entity Definitions 33 is next invoked, passing as parameters the Class and an empty string as the previous Class list (block 176). After this, the method for obtaining the Compositions Entity Definitions 31 is invoked, passing as parameters the Class and an empty string as the previous Class list (block 177). Another inquiry is then made as to whether or not there are more Packages (diamond 178). If the answer to this inquiry is yes, then a return is made back to the diamond 173. On the other hand, if the answer to this inquiry is no, then the process ends (bubble 179). It is pointed out that if the answer to the inquiry depicted by the diamond 173 or the diamond 174 is no, then the branch made is to the diamond 178.

Figure 14A:
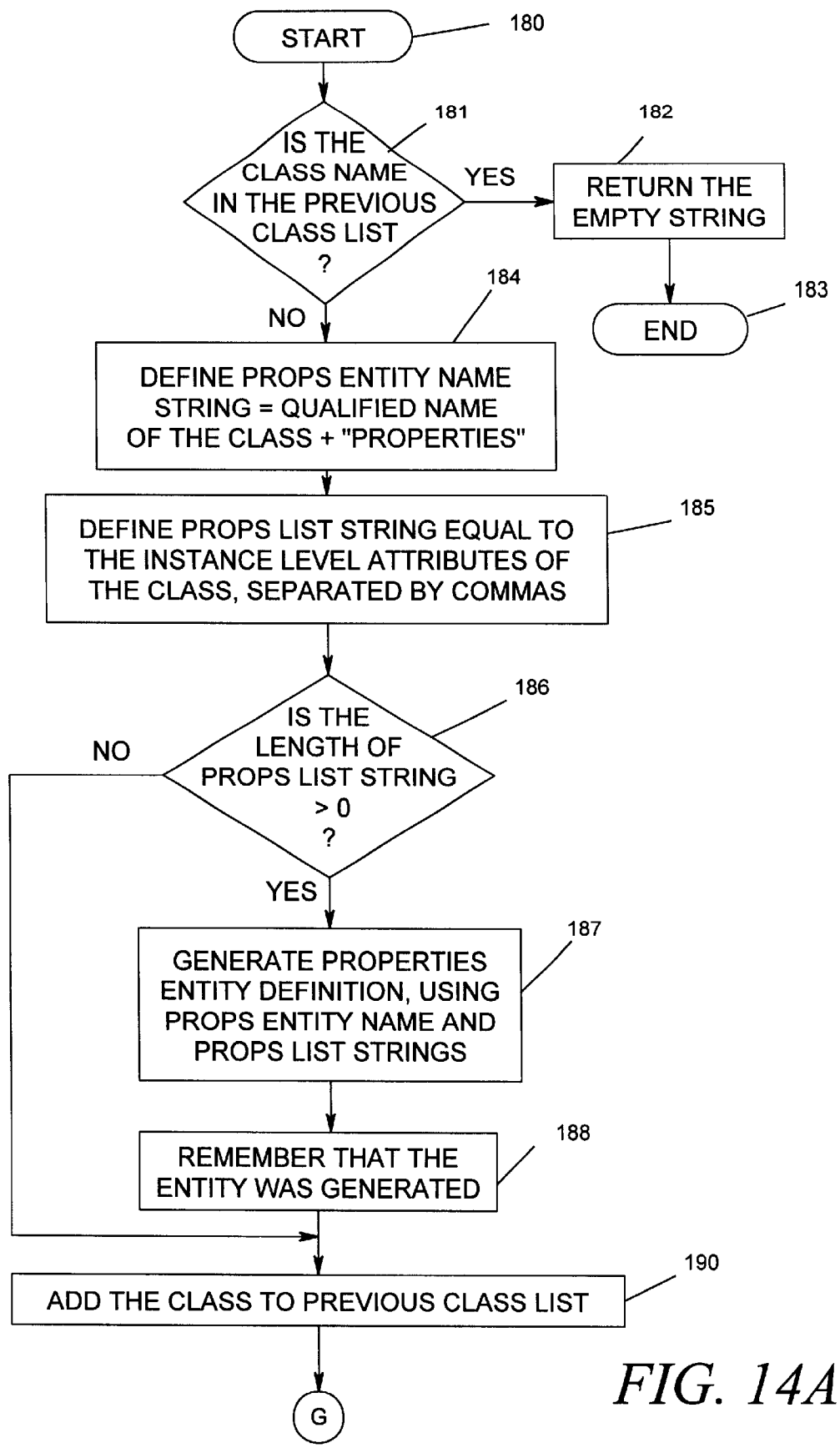
FIGS. 14A and 14B combined form a flow chart of the Properties Entities definition process.

Referring now to FIG. 14A, the first of a two-sheet flow chart of the Properties Entities Definitions 32 process is illustrated. The process begins with a start bubble 180 followed by an inquiry as to whether or not the name this Class appears in the previous Class list parameter string (diamond 181). If the answer to this inquiry is yes, then an empty string is returned (block 182) and the process ends (bubble (183). On the other hand, if the answer to this inquiry is no, then a props entity name string is defined equal to the qualified name of the Class plus "Properties" (block 184). It is noted that the processing in blocks 175 through 177 is invoked initially for the topmost Classes in the Class hierarchy in the meta-model and proceeds downward through the Class hierarchy.

After this, a props list string is defined with a value equal to the instance level attributes of the Class, separated by commas (",") to indicate that all must be present (block 185). This is followed by an inquiry as to whether or not the length of the props list string is greater than zero (diamond 186). If the answer to this inquiry is yes, then the XML Properties entity definition is generated using the props entity name and props list strings (block 187). The fact that an entity was generated for the Class is remembered (block 188). If the answer to the inquiry depicted by the diamond 186 is no, or upon completion of the step depicted by the block 188, the Class name is added to the previous class list (block 190) and the process illustration continues in FIG. 14B as denoted by a connector G.

Figure 14B:
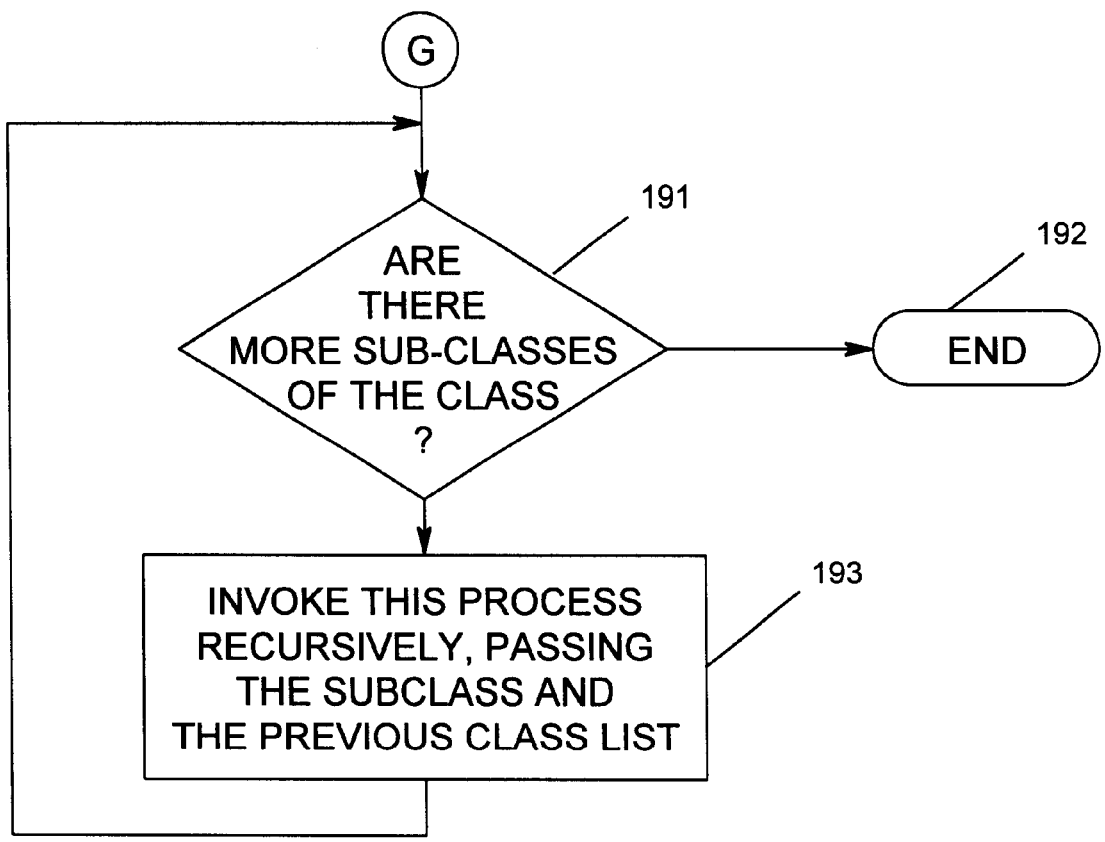

Referring now to FIG. 14B at the connector G, an inquiry is made as to whether or not there are more sub-Classes for the Class (diamond 191). If the answer to this inquiry is no, then the process ends (bubble 192). On the other hand, if the answer to this inquiry is yes, then the process is invoked recursively, passing the sub-Class and the previous Class list (block 193). Upon completion of this step, a return is made back to the diamond 191 for processing the next sub-Class for the Class.

Figure 15A:
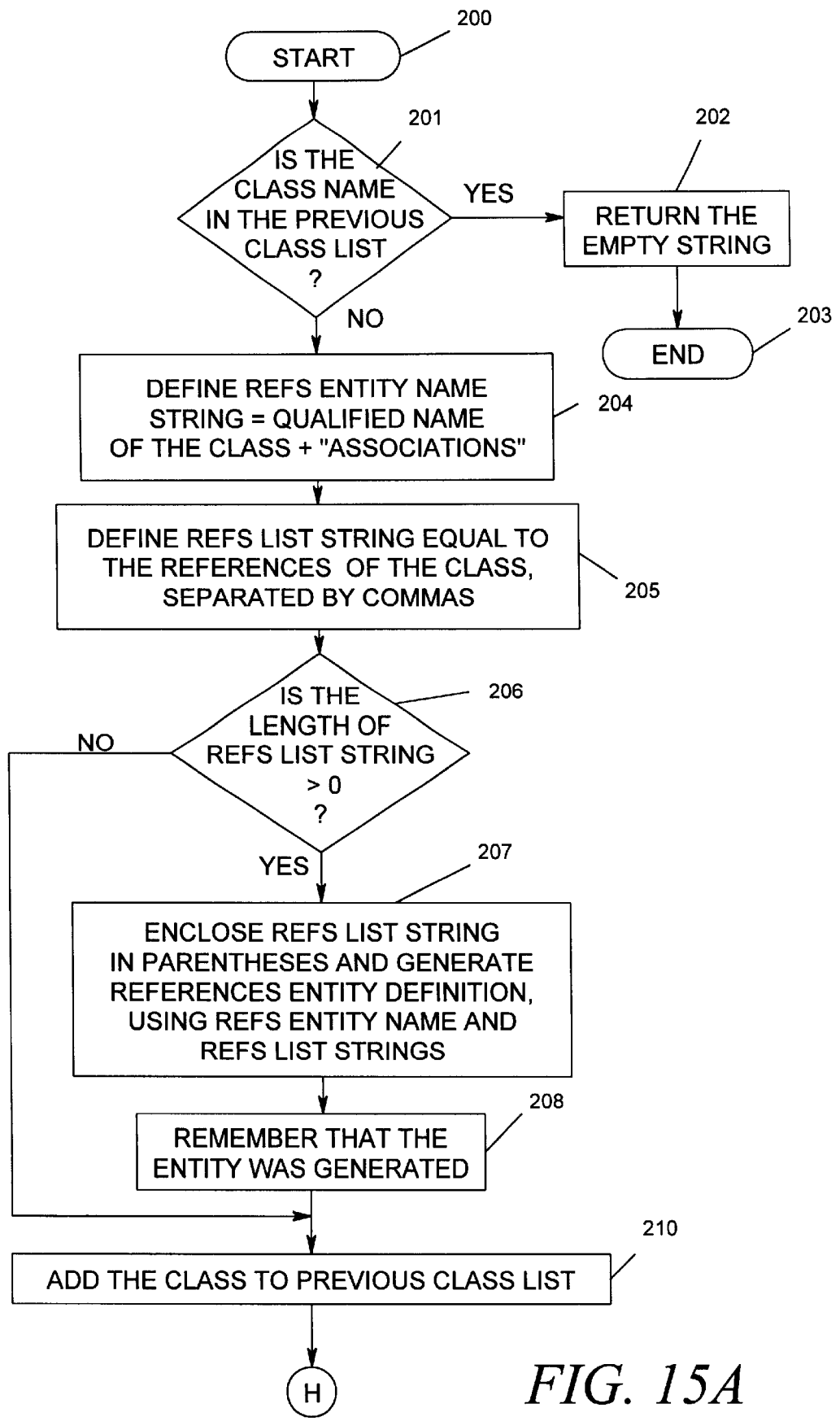
FIGS. 15A and 15B combined form a flow chart of the References Entities definition process.

Referring now to FIG. 15A, the first of a two-sheet flow chart of the References Entities Definitions 33 process is illustrated. The process begins with a start bubble 200 followed by an inquiry as to whether or not the name this Class appears in the previous Class list parameter string (diamond 201). If the answer to this inquiry is yes, then an empty string is returned (block 202) and the process ends (bubble (203). On the other hand, if the answer to this inquiry is no, then a refs entity name string is defined equal to the qualified name of the Class plus "Associations" (block 204).

After this, a refs list string is defined with a value equal to the non-composed References of the Class, separated by commas (",") to indicate that all must be present (block 205). This is followed by an inquiry as to whether or not the length of the ref s list string is greater than zero (diamond 206). If the answer to this inquiry is yes, then the refs list string is enclosed and the XML References entity definition is generated using the refs entity name and refs list strings (block 207). The fact that an entity was generated for the Class is remembered (block 208). If the answer to the inquiry depicted by the diamond 206 is no, or upon completion of the step depicted by the block 208, the Class name is added to the previous class list (block 210) and the process illustration continues in FIG. 15B as denoted by a connector H.

Figure 15B:
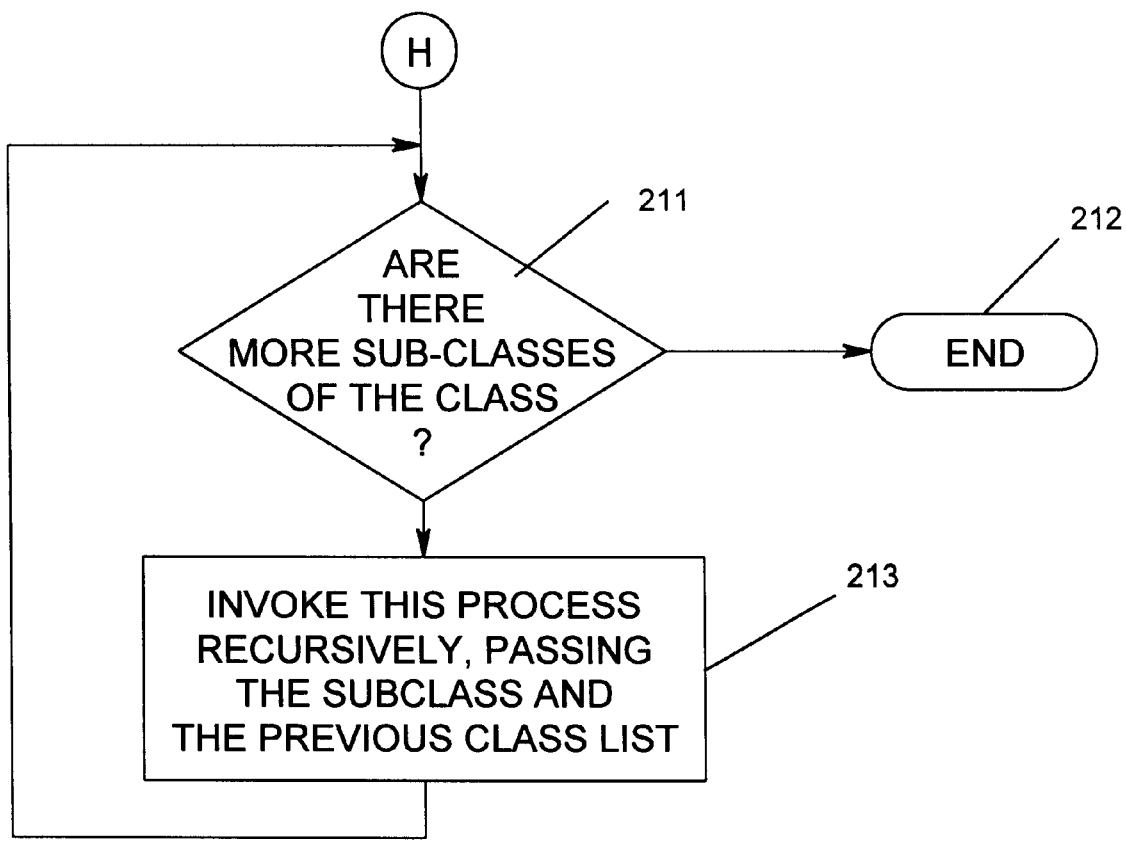

Referring now to FIG. 15B at the connector H, an inquiry is made as to whether or not there are more sub-Classes for the Class (diamond 211). If the answer to this inquiry is no, then the process ends (bubble 212). On the other hand, if the answer to this inquiry is yes, then the process is invoked recursively, passing the sub-Class and the previous Class list (block 213). Upon completion of this step, a return is made back to the diamond 211 for processing the next sub-Class for the Class.

Figure 16A:
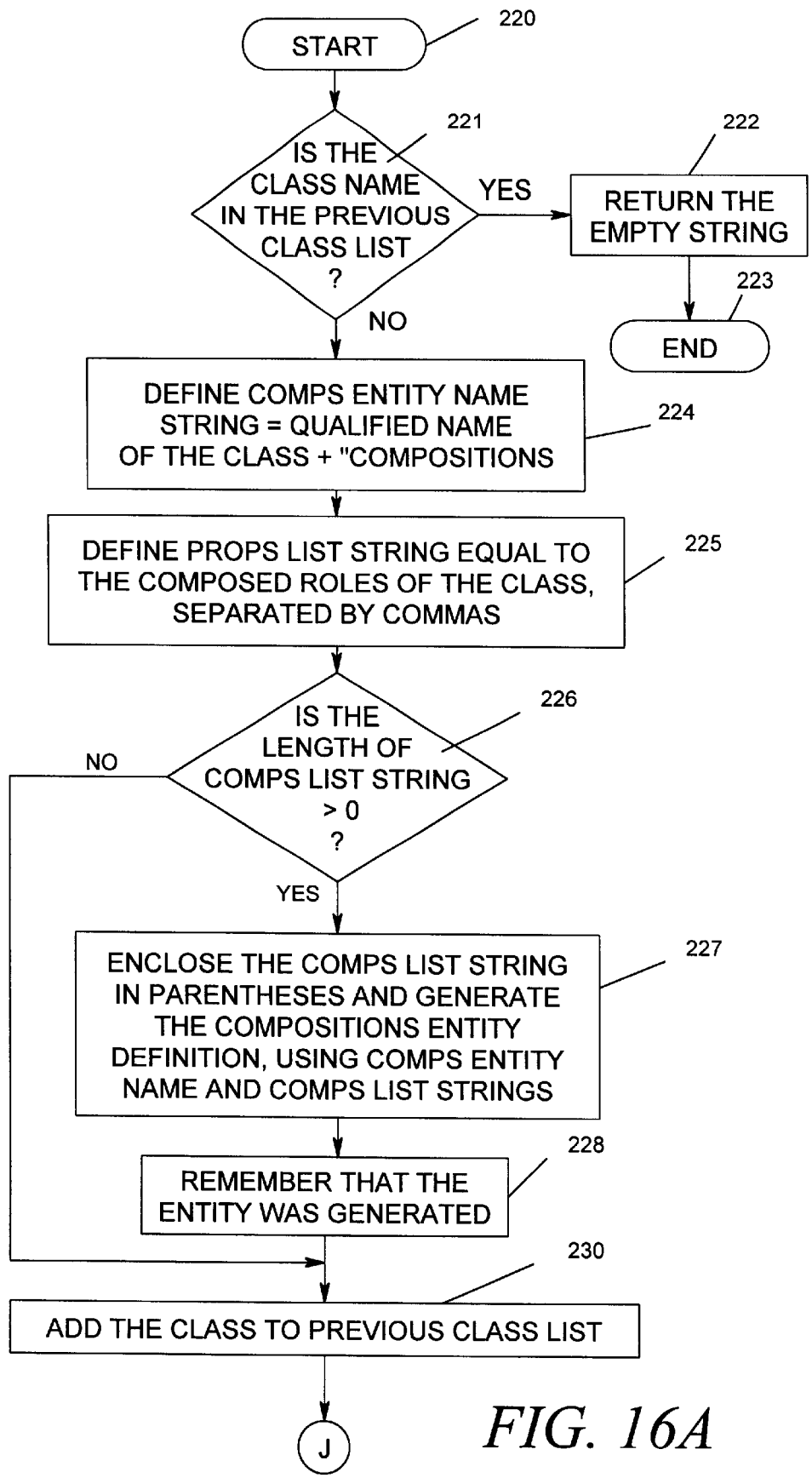
FIGS. 16A and 16B combined form a flow chart of the Compositions Entities definition process.

Referring now to FIG. 16A, the first of a two-sheet flow chart of the Compositions Entities Definitions 31 process is illustrated. The process begins with a start bubble 220 followed by an inquiry as to whether or not the name this Class appears in the previous Class list parameter string (diamond 221). If the answer to this inquiry is yes, then an empty string is returned (block 222) and the process ends (bubble (223). On the other hand, if the answer to this inquiry is no, then a comps entity name string is defined equal to the qualified name of the Class plus "Compositions" (block 224).

After this, a comps list string is defined with a value equal to the composite References of the Class, separated by commas (",") to indicate that all must be present (block 225). This is followed by an inquiry as to whether or not the length of the comps list string is greater than zero (diamond 226). If the answer to this inquiry is yes, then the comps list string is enclosed and the XML Compositions entity definition is generated using the comps entity name and comps list strings (block 227). The fact that an entity was generated for the Class is remembered (block 228). If the answer to the inquiry depicted by the diamond 226 is no, or upon completion of the step depicted by the block 228, the Class name is added to the previous class list (block 230) and the process illustration continues in FIG. 16B as denoted by a connector J.

Figure 16B:
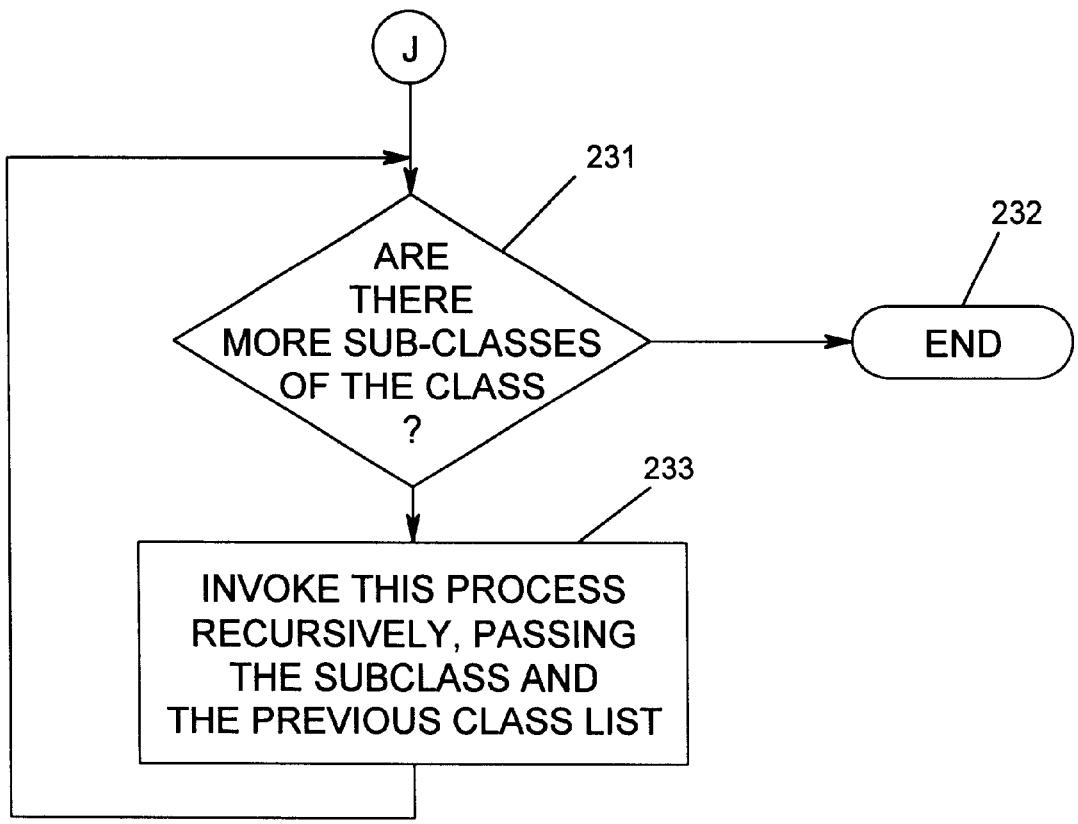

Referring now to FIG. 16B at the connector J, an inquiry is made as to whether or not there are more sub-Classes for the Class (diamond 231). If the answer to this inquiry is no, then the process ends (bubble 232). On the other hand, if the answer to this inquiry is yes, then the process is invoked recursively, passing the sub-Class and the previous Class list (block 233). Upon completion of this step, a return is made back to the diamond 231 for processing the next sub-Class for the Class.

Auxiliary functions are required for several purposes, among which are the recursive procedures to manage inheritance and for XML details. The code for implementing the auxiliary functions is set forth in Exhibit A hereof.

These functions illustrate possible methods to perform the textual manipulations necessary to insure that the formatting of the XML definitions is correct. They also illustrate possible methods to obtain lists of Attributes, Classes, etc., where Class or Package inheritance is involved. While these functions can be used to perform the indicated operation, they are not necessarily the only means of so doing.

The GetClasses auxiliary function takes two parameters, Class and a list of the names of previously-visited classes, and is used whenever it is necessary to list all of the possible Classes to which an operation should apply. It puts the name of the parameter Class into the result and then calls itself recursively to append the Class names of each sub-Class, if any, of the parameter Class, using the previous classes list to avoid visiting the same sub-Class more than once. It separates the names of the Classes with the XML alternative indication, the vertical bar ("|").

The GetAttributes auxiliary function takes a Class as a parameter and returns a list of the non-derived Attributes of the Class, if any, with the multiplicity of each Attribute relative to the Class reflected by the proper XML multiplicity specifier. Either the classifier level Attributes of the Class or its instance level Attributes may be thus obtained.

The GetReferences auxiliary function takes a Class as a parameter and returns a list References, if any, of the Class the aggregation of whose exposedEnd is not composite, separated by commas, with the multiplicity of each Reference relative to the Class reflected by the proper XML multiplicity specifier.

The GetComposedRoles auxiliary function takes a Class as a parameter and returns a list References, if any, of the Class the aggregation of whose exposedEnd is composite, with the multiplicity of each Reference relative to the Class reflected by the proper XML multiplicity specifier.

The GetReferenceMultiplicity auxiliary function takes a Reference as a parameter and returns the proper XML multiplicity specifier for the Reference.

The GetContainedClasses auxiliary function takes two parameters, a Class and a list of the names of previously visited Classes. It recursively calls itself to get the Classes contained in all parent Class(es) of the parameter Class, using the previous Classes list to avoid visiting the same parent Class more than once. It then appends to this list the names of the Classes contained within the parameter Class itself. It encloses the result in parentheses ("()") and appends an XML multiplicity of "*".

The GetClassLevelAttributes auxiliary function takes a Package as a parameter and is used to obtain a list of all classifier level Attributes of all Classes, which might appear in the Package. It calls itself recursively to obtain the classifier level Attributes of its parent Package(s), if any. It then calls the GetAttributes function for each Class of the parameter Package to obtain the list of classifier Attributes of said Class and combines this list with the list of those from the parent Packages.

The GetNestedClassLevelAttributes auxiliary function takes a Package as a parameter and is used to obtain a list of all classifier level Attributes of all Classes which might appear in the Package or in any Package nested within it. It creates the list of the classifier level Attributes of the Classes of the parameter Package itself and then calls itself recursively to obtain this information for the Packages nested within it.

The GetPackageClasses auxiliary function takes a Package as a parameter and is used to obtain a list of the names of all of the Classes in the parameter Package and all of the Packages from which it is derived, or in which it is contained. It calls itself recursively to obtain the Package Classes for its parent or containing Packages and then appends to this list the names of the Classes in the parameter Package itself.

The GetContainedPackages auxiliary function takes a Package as a parameter and is used to obtain a list of the names of the Packages contained in the parameter Package and its parent Packages. It calls itself recursively to obtain this information for its parent Packages and then appends the names of the Packages that it contains.

The GetUnreferencedAssociations auxiliary function takes a Package as a parameter and is used to obtain a list of the names of the unreferenced Associations, if any, of the parameter Package and its parent Packages. An unreferenced Association is one in which neither of the AssociationEnds of the Association is referred to by a Reference. This function calls itself recursively to obtain this information for its parent Packages and then appends the names of the unreferenced Associations of the parameter Package itself.

The GetPropertiesEntities2 auxiliary function takes two parameters, a Class and a list of the names of previously-visited Classes, and is used to invoke the Properties Entities for the parameter Class and all of its parent Classes. It calls itself recursively for each of its parent Classes, using the previous Classes list to avoid visiting the same parent more than once. It thus obtain the Entity invocations for the parent Classes. Then, if a Properties entity was generated for the parameter Class itself, it appends the invocation of said Properties Entity to the result.

The GetRefsEntities2 auxiliary function takes two parameters, a Class and a list of the names of previously-visited Classes, and is used to invoke the References Entities for the parameter Class and all of its parent Classes. It calls itself recursively for each of its parent Classes, using the previous Classes list to avoid visiting the same parent more than once. It thus obtain the Entity invocations for the parent Classes. Then, if a References entity was generated for the parameter Class itself, it appends the invocation of said References Entity to the result.

The GetCompsEntities2 auxiliary function takes two parameters, a Class and a list of the names of previously-visited Classes, and is used to invoke the Compositions Entities for the parameter Class and all of its parent Classes. It calls itself recursively for each of its parent Classes, using the previous Classes list to avoid visiting the same parent more than once. It thus obtain the Entity invocations for the parent Classes. Then, if a Compositions entity was generated for the parameter Class itself, it appends the invocation of said Compositions Entity to the result.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

---

Exhibit A

GetPropertiesEntities2

Function GetPropertiesEntities2(in cls: Class, inout previousCls: String) Returns String
  If cls appears in previousCls Then
    Return the empty string ('')
  End -continued Exhibit A

```
Set parentProps := the empty string ('')
For each parent Class of cls Do
    Set temp := GetPropertiesEntities2(the parent Class, prevCls)
    If Length (temp) > 0 Then
        If Length(parentProps) > 0 Then
            Set parentProps := parentProps + ','
        End
        Set parentProps := parentProps + temp
    End
End
Set ClassName := the qualified name of cls
Set props := the empty string ('')
If a property ENTITY was generated for cls (see #8) Then
    If Length (parentProps) > 0 Then
        Set parentProps := parentProps + ','
    End
    Set props := '%' + ClassName + 'Properties' + ';'
End
Add cls to previousCls
Return parentProps + props
End
GetRefsEntities2

Function GetRefsEntities2(in cls: Class, inout
previousCls : String) Returns String
    If cls appears in previousCls Then
        Return the empty string ('')
    End
    Set parentRefs := the empty string ('')
    For each parent Class of cls Do
        Set temp := GetRefsEntities2(the parent Class, previousCls)
        If Length (temp) > 0) Then
            If Length (parentRefs) > 0 Then
                Set parentRefs := parentRefs + ','
            End
            Set parentRefs := parentRefs + temp
        End
    End
    Set ClassName := the qualified name of cls
    Set refs := the empty string ('')
    If a References ENTITY was generated for cls (See #9) Then
        If Length(parentRefs) > 0 Then
            Set parentRefs := parentRefs + ','
        End
        Set ref := '%' + ClassName + 'Associations' + ';'
    End
    Add cls to previousCls
    Return parentRefs + refs
End
GetCompsEntities2

Function GetCompsEntities2(in cls: Class, inout
previousCls : String) Returns String
    If cls appears in previousCls Then
        Return the empty string ('')
    End
    Set parentComps := the empty string ('')
    For each parent Class of cls Do
        Set temp := GetCompsEntities2(the parent Class, previousCls)
        If Length(temp) > 0 Then
            If Length(parentComps) > 0 Then
                Set parentComps := parentComps + ','
            End
            Set parentComps := parentComps + temp
        End
    End
    Set ClassName := the qualified name of cls
    Set comps := the empty string ('')
    If a compositions !ENTITY was generated for cls Then
        If Length (parentComps) > 0 Then
            Set parentComps := parentComps + ','
        End
        Set comps := '%' + ClassName + 'Compositions' + ';'
    End
    Add cls to previousCls
    Return parentComps + comps
End
```

-continued

Exhibit A

```
GetAttributes

Function GetAttributes(in cls : Class, in type: String) Returns String
    Set rslt := ''
    For each Attribute of cls, in the order specified by the
    MOF definition of the Class Do
        If isDerived is false Then
            If(type = 'instance' And scope is instanceLevel) Or
              (type = 'classifier' And scope is classifierLevel) Then
                Set name := Qualified name of the Attribute
                If the multiplicity of the Attribute is "1..*" Then
                    Set m := '+' (or '*' for a relaxed DTD)
                Else If the multiplicity of the Attribute is "0..1" Then
                    Set m := '?'
                Else If the multiplicity of the Attribute is not "1..1" Then
                    Set m := '*'
                Else
                    Set m := '' (or '?' for a relaxed DTD)
                End
                If Length(rslt) > 0 Then
                    Set rslt := rslt + ','
                End
                Set rslt := rslt + name + m
            End
        End
    End
    Return rslt
End
GetReferences Function GetReferences(in cls : Class) Returns String
    Set refs := ''
    For Each Reference contained in cls Do
        If Reference.exposedEnd.aggregation is not composite Then
            Set name := Qualified name of the Reference
            Set m := GetReferenceMultiplicity(Reference)
            Set temp := name + m
            If Length(refs) > 0 Then
                Set refs := refs + ','
            End
            Set refs := refs + temp
        End
    End
    Return refs
End
GetReferenceMultiplicity Function GetReferenceMultiplicity(in ref:Reference) Returns String
    IfRef.referencedEnd.multiplicity is "0..1" Or
       Ref.referencedEnd.aggregation is composite Then
        Set m := '?'
    Else If Ref.referencedEnd.multiplicity is "1..*" Then
        Set m := '+' (or '*' for a relaxed DTD)
    Else If Ref.referencedEnd.multiplicity is not "1..1" Then
        Set m := '*'
    Else
        Set m := '' (or '?' for a relaxed DTD)
    End
    Return m
End
GetContainedClasses Function GetContainedClasses(in cls : Class, inout
previousCls : String) Returns String
    If cls appears in previousCls, return the empty string
    Set parentClasses := ''
    For each parent Class of cls Do
        Set temp := GetContainedClasses(parent Class)
        If Length(parentClasses) > 0 and Length(temp) > 0 Then
            Set parentClasses := parentClasses + ','
        End
        Set parentClasses := parentClasses + temp
    End
    Set classes := ''
    For Each Class contained in cls Do
        Set Temp := Qualified name of the contained Class
        If Length(classes) > 0 Then
```

-continued

Exhibit A

```
        Set classes := classes + '|'
      End
      Set classes := classes + Temp
    End
    If Length(classes) > 0 Then
      If Length(parentClasses) > 0 Then
        Set parentClasses := parentClasses + ','
      End
      Set classes = '(' + classes + ')' + '*'
    End
    Add cls to previousCls
    Return parentClasses + classes
End
GetComposedRoles Function GetComposedRoles(in cls : Class) Returns String
    Set rslt := ''
    For Each Reference of cls Do
      If the aggregation of the AssociationEnd which is exposedEnd of the
            Reference is composite Then
        Set name := Qualified name of the Reference
        Set m := GetReferenceMultiplicity(the Reference)
        If Length(rslt) > 0 Then
          Set rslt := rslt + ','
        End
        Set rslt := rslt + name + m
      End
    End
    Return rslt
End
GetClasses Function GetClasses(in cls : Class, inout prevCls) Returns String
    If cls appears in prevCls, return the empty string ('')
    Set rslt := the qualified name of cls
    For Each subclass of Cls Do
      Set Temp := GetClasses(the subclass, prevCls)
      If (Length(Temp) > 0) Then
        Set rslt := rslt + '|'
      End
      Set rslt := rslt + Temp
    End
    Add cls to prevCls
    Return rslt
End
GetClassLevelAttributes Function GetClassLevelAttributes(in pkg : Package) Returns String
    If pkg has a parent or containing Package Then
      Set parentAtts := GetClassLevelAttributes(parent Package)
    End
    Set atts := ''
    For Each Class of pkg Do
      Set temp := GetAttributes(the Class,'classifier')
      If Length(temp) > 0 And Length (atts) > 0) Then
        Set atts := atts + '|'
      End
      Set atts := atts + temp
    End
    If Length(atts) > 0) then
      If Length(parentAtts) > 0 Then
        Set parentAtts := parentAtts + ','
      End
      Set atts := '(' + atts + ')'
    End
    Return parentAtts + atts
End
GetNestedClassLevelAttributes Function GetNestedClassLevelAttributes(in pkg : Package)
Returns String
    Set rslt :- ''
    For each Class of pkg Do
      Set temp := GetAttributes(the Class, 'classifier')
      If Length(temp) > 0 Then
        If Length (rslt) > 0) Then
          Set rslt := rslt + '|'
        End
        Set temp := '(' + temp + ')'
      End
      Set rslt := rslt + temp
    End
    For Each Package of Pkg
      Set childAtts := GetNestedClassLevelAttributes(contained Package)
      If Length(childAtts) > 0 Then
        If Length(rslt) > 0 Then
          Set rslt := '(' + rslt + ')' + ','
        End
        Set childAtts := '(' + childAtts + ')'
      End
      Set rslt := rslt + childAtts
    End
    Return rslt
End
GetPackageClasses Function GetPackageClasses(in pkg : Package) Returns String
    If pkg has a parent or containing Package Then
      Set parentClasses := GetPackageClasses(parent Package)
    End
    Set classes := ''
    For Each Class of pkg Do
      Set Temp := Qualified name of the Class
      If Length(classes) > 0 Then
        Set classes := classes + '|'
      End
      Set classes := classes + Temp
    End
    If Length(parentClasses) > 0 and Length(classes) > 0) Then
      Set parentClasses := parentClasses + '|'
    End
    Return parentClasses + classes
End
GetContainedPackages Function GetContainedPackages(in pkg:Package) Returns String
    If pkg has a parent Package Then
      Set parentPkgs := GetContainedPackages(parent Package)
    End
    Set pkgs := ''
    For Each (sub) Package of pkg Do
      Set Temp := Qualified name of the (sub) Package.
      If Length(pkgs) > 0 Then
        Set pkgs := pkgs + '|'
      End
      Set pkgs := pkgs + Temp
    End
    If Length(parentPkgs) > 0 and Length(pkgs) > 0) Then
      Set parentPkgs := pkgs + '|'
    End
    Return parentPkgs + pkgs
End
GetUnreferencedAssociations Function GetUnreferencedAssociations(in pkg: Package) Returns String
    Set parentAssns := ''
    If pkg has a parent Package Then
      Set parentAssns := GetUnreferencedAssociations(parent Package)
    End
    Set assns := ''
    For each Association of pkg Do
      If isDerived is false Then
        If The Association has no References Then
          Set temp := qualified name of the Association
          If Length(assns) > 0) then
            Set assns := assns + '|'
          End
          Set assns := assns + temp
        End
      End
    End
    If Length(parentAssns >0 ) and Length(assns) > 0) Then
      Set parentAssns := parentAssns + '|'
    End
```

Exhibit A

```
Return parentAssns + assns
End
```

What is claimed is:

1. In a software development framework having a repository and one or more software systems wherein said repository contains a meta-model and said software systems, which store instances of said meta-model, a method for enabling exchange of said instances of said meta-model among said software systems using a generalized data transfer language, said method comprising the steps of:
   a. extracting a fixed component and a variable component of said meta-model;
   b. parsing said variable component into a first set of constituent components for a first instance of said variable component;
   c. extracting a list of repeated components from said first set of constituent components;
   d. transforming said repeated components in said list of repeated components into corresponding components of a generalized software language;
   e. transforming each of said first set of constituent components into corresponding components of said generalized software language;
   f. transforming said first instance of said variable component into corresponding components of said generalized software language;
   g. repeating steps b through f for a second instance of said variable component;
   h. transforming said fixed component into corresponding components of said generalized software language;
   i. distributing said corresponding components to another instance of said software model; and,
   j. using said corresponding components distributed in the preceding step to control the syntax of said generalized data transfer language for exchanging said meta-model instances.

2. A method according to claim 1 wherein step c thereof further includes the step of generating separate objects for each list of repeated components and using said separate objects to transform multiple instances of said repeated components into corresponding components of said generalized software language.

3. The method as in claim 1 wherein each of said generalized software language components created by said transformation of each of said repeated components in said list of repeated components is an XML entity definition.

4. The method as in claim 1 wherein said generalized software language components created by said transformation of said constituent components are XML element definitions.

5. The method as in claim 1 wherein said generalized software language components created by said transformation of said instances of said variable components are XML element definitions.

6. A method according to claim 1 wherein step f thereof further includes the step of incorporating references to said corresponding components of said general purpose software language created by said transformation of each of said repeated components in said list of repeated components.

7. A method according to claim 1 wherein said meta-model is a meta-metamodel with instances that are themselves meta-models.

8. A method according to claim 1 further including facilitating exchange of data of said software model between two software systems.

9. A method as in claim 1 wherein said meta-model is the Unified Modeling Language (UML).

10. The method in claim 1 wherein said data transfer language is extensible Markup Language (XML).

11. The method as in claim 1 wherein said generalized data transfer language is the Document Type Definition (DTD) specification language for XML.

12. The method as in claim 1 wherein said software systems are software modeling tools.

13. A storage medium for use in a software development framework having a repository and at least two software systems wherein said repository contains a meta-model and said software systems, which are capable of storing instances of said meta-model, said medium encoded with machine-readable computer program code for enabling exchange of said instances of said meta-model among said software systems using a generalized data transfer language, wherein when the computer program code is executed by a computer, the computer performs the steps of:
   a. extracting a fixed component and a variable component of said meta-model;
   b. parsing said variable component into a first set of constituent components for a first instance of said variable component;
   c. extracting a list of repeated components from said first set of constituent components;
   d. transforming said repeated components in said list of repeated components into corresponding components of a generalized software language;
   e. transforming each of said first set of constituent components into corresponding components of said generalized software language;
   f. transforming said first instance of variable component into corresponding components of said generalized software language;
   g. repeating steps b to f for a second instance of said variable component;
   h. transforming said fixed component into corresponding components of said generalized software language;
   i. distributing said corresponding components to said second instance of said software model; and,
   j. using said distributed said corresponding components to control the syntax of said generalized data transfer language to exchange said meta-model instances.

14. A medium according to claim 13 wherein step c thereof further includes the step of generating separate objects for each list of repeated components and using said separate objects to transform multiple instances of said repeated components into corresponding components of said generalized software language.

15. A medium according to claim 13 wherein said instance of said meta-model is based on a software model.

16. A medium according to claim 13 further including facilitating exchange of data of said software model between two software systems.

17. A medium according to claim 13 wherein said meta-model is the Unified Modeling Language (UML).

18. A medium according to claim 13 wherein said data transfer language is extensible Markup Language (XML).

19. A medium according to claim 13 wherein said generalized software language is the Document Type Definition (DTD) specification for XML.

20. A medium according to claim 13 wherein said software systems are software modeling tools.

21. A medium according to claim 13 wherein one of said instances of said meta-model is based on a software model.

22. A medium according to claim 13 further including facilitating exchange of said software model data between two software systems.

23. In a software development framework having a repository and at least two software systems wherein said repository contains a meta-model and said software systems, which store instances of said meta-model, a method for enabling exchange of said instances of said meta-model among said software systems using a generalized data transfer language, said method comprising the steps of:

a. mapping primary objects of said meta-model to constructs of said generalized data transfer language;

b. mapping component parts and relationships of said primary meta-model objects to component constructs of said generalized data transfer language;

c. further mapping of groups of said relationships of said meta-model to aggregate constructs of said data transfer language;

d. mapping grouping mechanisms of said meta-model to grouping constructs of said generalized data transfer language;

e. defining algorithms for traversing said meta-model to obtain information about said component parts and relationships of said primary components necessary for preserving said information in a process of transforming said component parts and relationships, primary objects and grouping mechanisms into generalized software language components used to express said constructs, component constructs and grouping constructs of said generalized data transfer language;

f. defining algorithms for transforming groups of said relationships into generalized software language constructs used to express said aggregate constructs of said generalized data transfer language; and, g. expressing relationships among said generalized software language components, whereby reliable and correct programs to perform said transforming of said component parts and relationships, primary objects and grouping mechanisms into said generalized software language components can be written.

\* \* \* \* \*